United States Patent
Ichioka et al.

(10) Patent No.: US 6,801,289 B2
(45) Date of Patent: Oct. 5, 2004

(54) LIQUID CRYSTAL DISPLAY DEVICE

(75) Inventors: Hideki Ichioka, Nabari (JP); Tomohiko Yamamoto, Nara (JP); Naoto Inoue, Shiki-gun (JP); Keiichi Tanaka, Tenri (JP); Koji Fujiwara, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 1 day.

(21) Appl. No.: 10/091,343

(22) Filed: Mar. 6, 2002

(65) Prior Publication Data

US 2002/0171797 A1 Nov. 21, 2002

(30) Foreign Application Priority Data

Mar. 8, 2001 (JP) .......................................... 2001-65642
Nov. 29, 2001 (JP) ........................................ 2001-365144

(51) Int. Cl.[7] ............................................ G02F 1/1345
(52) U.S. Cl. ...................... 349/152; 349/149; 349/153; 349/155
(58) Field of Search ................................ 349/149, 151, 349/152, 154, 153, 155

(56) References Cited

U.S. PATENT DOCUMENTS 5,442,469 A  * 8/1995  Pitt .............................. 349/51
5,680,192 A  * 10/1997 Burrell et al. ............... 349/152
6,366,331 B1 * 4/2002  Sakamoto et al. ............ 349/43
6,466,294 B1 * 10/2002 Yamagishi et al. .......... 349/155
2001/0022640 A1 * 9/2001 Nakahara ..................... 349/123

FOREIGN PATENT DOCUMENTS

JP         5-165060 A     6/1993

* cited by examiner

*Primary Examiner*—Robert H. Kim
*Assistant Examiner*—Michael H. Caley
(74) *Attorney, Agent, or Firm*—Nixon & Vanderhye P.C.

(57) ABSTRACT

A liquid crystal display device has a liquid crystal layer between a glass substrate and a counter substrate. A TFT and scanning lines which control the TFT are provided on the glass substrate. On the counter substrate, a gradation signal line which is connected to a counter electrode applying a voltage to the liquid crystal layer is provided opposite to the scanning lines. A sealing section for sealing the liquid crystal of the liquid crystal layer is provided while enclosing the display area between the glass substrate and the counter substrate. The sealing section has conductive particles. Upper contact pads connected to the gradation signal lines and lower contact pads on the glass substrate are electrically connected via the conductive particles. This realizes a liquid crystal display device with a smaller frame and makes the mounting compact in size without causing poor connection due to line breakage.

27 Claims, 22 Drawing Sheets

FINAL POTENTIAL = POTENTIAL TO DETERMINE GRADATION
GRADATION SIGNAL OR REFERENCE SIGNAL
SCANNING SIGNAL

INPUT WAVEFORM OF A SIGNAL LINE

BLACK DISPLAY
(THE CASE OF NORMALLY BLACK)

WHITE DISPLAY
(THE CASE OF NORMALLY WHITE)

NORMAL DISTRIBUTION OF DISTRIBUTED
CONDUCTIVE PARTICLES

FIG. 21 (a) (PRIOR ART)
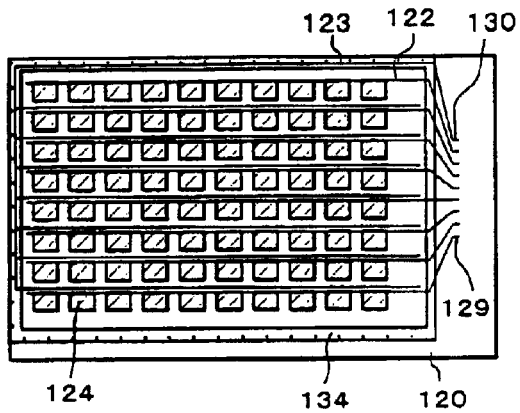
FIG. 21 (b) (PRIOR ART)
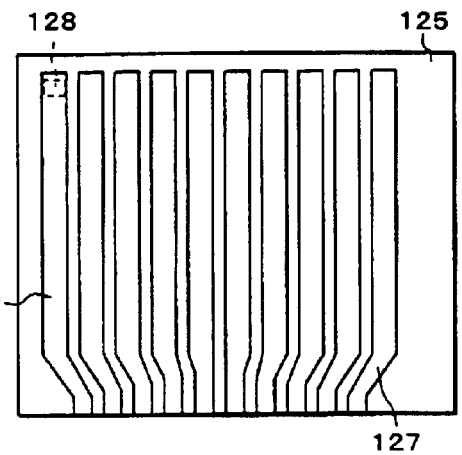
FIG. 21 (c) (PRIOR ART)
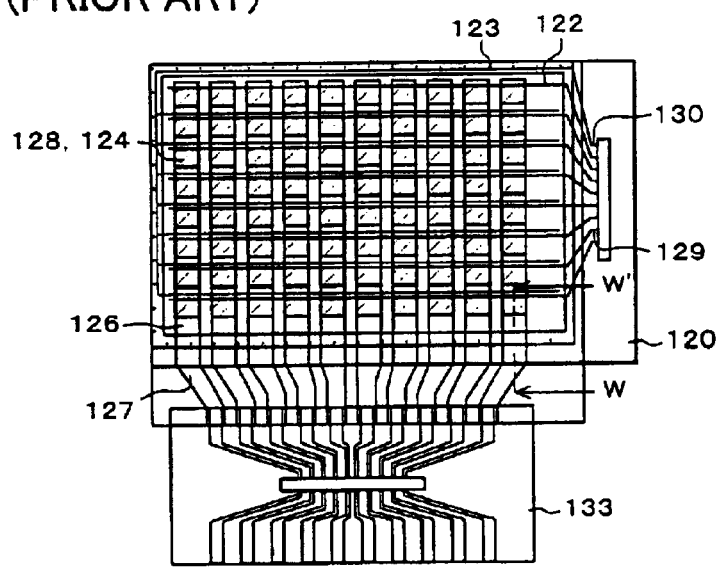
FIG. 21 (d) (PRIOR ART)
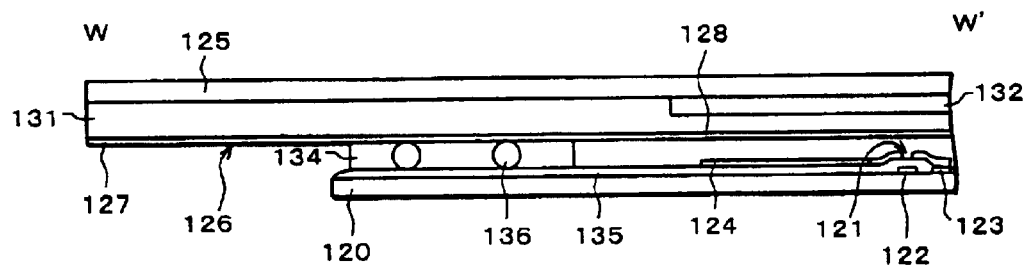

LIQUID CRYSTAL DISPLAY DEVICE

FIELD OF THE INVENTION

The present invention relates to an active matrix liquid crystal display device adopting switching elements such as MIM (metal insulator metal), TFT (thin film transistor).

BACKGROUND OF THE INVENTION

In recent years, a liquid crystal display device which consumes less power and has superior portability is often adopted as a display device of mobile phones. Especially, an STN-LCD (super twisted nematic-liquid crystal display) having a simple structure and of lower cost is widely adopted.

As shown in FIG. 17, the STN-LCD has a glass substrate 101 made of glass and a counter substrate 102 which are opposed via a liquid crystal layer (not shown). Further, a sealing section made of a sealing material for sealing the liquid crystal of the liquid crystal layer is provided so as to enclose the display area between the glass substrate 101 and the counter substrate 102.

The glass substrate 101 includes common lines 103 which also act as pixel electrodes for applying a voltage to the liquid crystal layer. The common line 103 is connected to a reference signal driver via a COM electrode on the glass substrate 101. The counter substrate 102 includes segment lines 104 which also act as pixel electrodes. The segment line 104 is connected to a gradation signal driver via a SEG electrode on the counter substrate 2. Further, the common line 103 and the segment line 104 are orthogonal, and both formed by a transparent conductive film such as ITO.

Further, in a color STN-LCD, the common line 103 is formed on a color filter and on an overcoat which protects the color filter. The overcoat is easy to get a scratch. This may cause the transparent conductive film which is formed on the overcoat to be the common line 103 to cut off even by an indistinct scratch which can be made during manufacturing processes since the common line 103 and the segment line 104 are formed on different substrates. Further, adhesion between the overcoat and the transparent conductive film made of ITO or the like is exceedingly weak in comparison with, for example, adhesion between glass and a transparent conductive film. Therefore, it is almost impossible to re-mount the reference signal driver and/or the gradation signal driver in the case where mounting is failed.

On the other hand, in a small or medium sized panel used for a display of a mobile phone, commonly, an input terminal of the common line 103 is formed on the counter substrate 102. And the input terminal and the common line 103 are electrically connected by transfer technology using conductive particles which are distributed in the sealing section. Hereinafter, this connection part is referred to as "a transfer section". By thus electrically connecting the input terminal and the common line 103 via the transfer section, the common line 103 and the segment line 104 can exist on a single substrate (the counter substrate 102).

As described, since the common line 103 electrically transfers to the transparent conductive film made of ITO or the like formed on the counter substrate 102 via the conductive particles distributed in the sealing section, it prevents the cutoff of the common line 103, and also, makes it possible to re-mount the reference signal driver and/or the gradation signal driver in the mounting process. Further, since the input terminal of the common line 103 is formed on the counter substrate 102, the common line 103 and the segment line 104 can exist on a single substrate (the counter substrate 102). This makes it possible to adopt a segment-common integral driver, and make the mounting compact in size.

However, in the foregoing STN-LCD, variation of contact resistance between the adjacent transfer sections is perceived as non-uniform display. Therefore, when assuming the mean distribution volume of the conductive particle is D, and its distribution is σ, even when the distribution density of the conductive particle is small like D-5σ, it is necessary to prevent contact resistance from being perceived as non-uniform display by conserving the transfer section area as large as possible and increasing the number of the conductive particle in the transfer section.

Here, the following will explain the variation of distribution volume of the conductive particle.

As shown in FIG. 18, when the conductive particles are distributed, the distribution is approximated by a normal distribution around the mean distribution volume D. When the volume of the conductive particle is more than the mean volume D, it is possible to ensure stable connection in the transfer section. In contrast, when the volume of the conductive particle is less than the mean volume D, connection in the transfer section, in other words, resistance in the transfer section varies depending on the distribution volume of conductive particle. Table 1 shows separation from the mean distribution volume D and probability of existence, regarding to the distributed conductive particles. (continued)

TABLE 1

| | |
|---|---|
| PROBABILITY OF EXISTENCE LESS THAN (D-σ) | 16% |
| PROBABILITY OF EXISTENCE LESS THAN (D-2σ) | 2.3% |
| PROBABILITY OF EXISTENCE LESS THAN (D-3σ) | 0.15% |
| PROBABILITY OF EXISTENCE LESS THAN (D-4σ) | $6.3 \times 1e^{-3}$% |
| PROBABILITY OF EXISTENCE LESS THAN (D-5σ) | $5.73 \times 1e^{-5}$% |

If assuming that the minimum particle density to prevent the contact resistance in the transfer section from being perceived as non-uniform display is $D_0$, Table 1 shows that poor contact occurs at a rate of 0.15% when $D_0=D-3\sigma$. Namely, when a panel has 160 transfer sections, at least one in 4.2 panels will show poor contact. Similarly, as shown in Table 1, poor contact occurs at a rate of $5.73e^{-5}$% when $D_0=D-5\sigma$. In this case, when a panel has 160 transfer sections, at least one in 10908 panels will show poor contact. Determination of the mean distribution volume D is important in the distribution of the conductive particle, because distribution σ is automatically determined by the mean distribution volume D, even though the distribution σ can be adjusted to some extent by using an automatic stirring device for stirring the sealing material.

The permitted limit of the STN-LCD for the contact resistance variation in the adjacent transfer sections becomes smaller, as the STN-LCD has high-precision (256 colors→4096 colors) and multi-gradation displays (6500 colors). Further, as the line width of sealing section becomes narrower in accordance with high-precision and narrower frame (narrower non-display area), the area of the transfer section becomes smaller. Accordingly, it is difficult to apply the technology of electric transfer using the conductive particles distributed in the sealing section to the STN-LCD in terms of high-precision, multi-gradation displays, and narrower frame (narrower non-display area) which are major factors for a mobile phone in next-generation.

Meanwhile, liquid crystal display devices of active driving type in which a switching element such as MIM or TFT of counter source structure have been proposed as a liquid crystal display device (LCD) having a simple structure like the STN-LCD. These liquid crystal display devices are more suitable for high-precision, multi-gradation displays, and narrower frame which are major factors for a mobile phone in next-generation, in comparison with the STN-LCD.

FIG. 19 shows an example of an equivalent circuit of the arrangement in a conventional active matrix liquid crystal display device. In this liquid crystal display device, pixel electrodes 111 are formed in a matrix manner on a transparent substrate which will be an active matrix substrate. Further, on the transparent substrate, a TFT 112 which is a switching element is provided for each pixel electrode 111. In each TFT 112, the pixel electrode 111 is connected to a drain electrode. And in the TFTs 112 which are horizontally (in a column direction) aligned in a display screen, respective gate electrodes are connected to a same reference scanning line 113, and also are connected to the same data line 114 in the TFTs 112 vertically (in a row direction) aligned in the display screen. Namely, the respective scanning lines 113, and the respective data lines 114 in the above directions are orthogonally disposed while surrounding the pixel electrode 111.

With the foregoing arrangement, the TFT 112 is controlled so as to turn on/off in response to the gate signal which is supplied via the scanning line 113. And when the TFT 112 is on, a data signal (display signal) is sent to the pixel electrode 111 via the data line 114.

Further, each drain electrode of the TFTs 112 is individually connected to the pixel electrode 111, and an electrode which forms an accumulation capacitor 115, and the other electrode opposite to the former electrode via an insulation layer is connected to a reference signal line 116. The accumulation capacitor 115 holds a voltage which is applied to the liquid crystal layer.

In the active matrix liquid crystal display device thus described, the liquid crystal layer is caught between the active matrix substrate and the counter substrate which is opposite to the active matrix substrate.

However, in the active matrix liquid crystal display device shown in FIG. 19, poor connection due to the cutoff is likely to occur at a crossing section of the scanning line 113 and the data line 114 which are orthogonally disposed on a single substrate. This decreases the yield, and increases the manufacturing cost.

This being the case, in order to solve these problems, a structure having data lines disposed on a counter substrate (hereinafter, referred to a counter matrix structure) has been conventionally proposed. An example of the arrangement of the counter matrix structure is shown in FIG. 20, FIGS. 21(a) through 21(d).

In this type of liquid crystal display device, pixel electrodes 124 are provided in a matrix manner on a glass substrate 120, and TFTs 121 are formed on the respective pixel electrodes 124. The drain electrode (or the source electrode) of each TFT 121 is connected to the pixel electrode 124, and the gate electrode is connected to a same scanning line 122 among the TFTs 121 which are horizontally (in a column direction) aligned in a display screen. These arrangements are the same as those of the liquid crystal display shown in FIG. 19. However, in contrast, the source electrode (or the drain electrode) of each of the TFTs 121 which are horizontally (in a column direction) aligned in the display screen is connected to a same reference signal line 123 instead of connected to the data line 114 where a data signal is applied, unlike the liquid crystal display device shown in FIG. 19. And gradation signal lines 126 are orthogonally disposed to scanning lines 122 of the glass substrate 120 on a counter substrate 125 which is opposite to the glass substrate 120 via a liquid crystal layer. Note that, in this arrangement, each gradation signal line 126 also acts as a counter electrode at the portion opposite to the pixel electrodes 124.

In the active matrix liquid crystal display device having the counter matrix structure thus described, since the crossing sections of the scanning line 122 and the gradation signal line 126 do not exist on a single substrate, the foregoing problems: decreases of the yield and reliability caused by poor connection due to the cutoff can be solved.

However, according to the arrangement shown in FIG. 20, FIGS. 21(a) through 21(d), since the scanning line 122 and the gradation signal line 126 are formed on respective substrates, the gradation signal line 126 made of a transparent conductive film of ITO or the like formed on an overcoat 131 (see FIG. 21(d)) may cut off even by an indistinct scratch which can be made during manufacturing processes. Further, adhesion between the overcoat 131 and the gradation signal line 126 is exceedingly weak in comparison with, for example, adhesion between the glass substrate 120 and the gradation signal line 126 made of transparent conductive film. Therefore, it is almost impossible to re-mount these liquid crystal display elements during a mounting process in the case where mounting is failed.

This being the case, a transparent conductive film (gradation signal line 126) made of ITO or the like is formed on a glass (glass substrate 120) by selectively removing the overcoat 131, to which having photosensitivity has been given, of the mounting part. This will solve the foregoing problems; however, the transmission rate of the overcoat 131 decreases due to its photosensitivity, and the transmission rate or the reflectance of the liquid crystal panel decreases. Further, an extra process for selectively removing the overcoat 131 is required. Moreover, the transparent conductive film of ITO or the like may cut off because of the difference in level between the portion having the overcoat 131 and the portion having no overcoat 131.

As shown in FIG. 21(b), a counter electrode 128 and an input terminal 127 are connected to the gradation signal line 126 on the counter substrate 125. Further, in addition to the arrangement shown in FIG. 20, a gate insulation film 135 (see in FIG. 21(d)), an input terminal 130 connected to the gradation signal line 123, and an input terminal 129 connected to the scanning line 122 (see in FIG. 21(a)) are formed on the glass substrate 120. Further, a sealing section 134 which seals liquid crystal has spacers 136, and its cell thickness is held by the diameter of the spacer 136.

Furthermore, since the scanning line 122 and the gradation signal line 126 are formed on respective substrates, the input terminal 127 and the input terminal 129 are also formed on respective substrates. Therefore, as shown in FIG. 21(c), the liquid crystal element becomes bulky when TAB 133 is mounted, and it is impossible to adopt a compact mounting such as COG.

SUMMARY OF THE INVENTION

It is an object of the present invention to provide a liquid crystal display device with smaller frame and the compact mounting in size without causing poor connection due to cutoff.

In order to attain the foregoing object, a liquid crystal display device according to the present invention includes a switching element substrate having switching elements, a counter substrate opposite to the switching element substrate, a liquid crystal layer formed between the substrates, a sealing section having conductive particles and provided so as to enclose a display area between the substrates for sealing liquid crystal constituting the liquid crystal layer, first signal wiring provided on one of the substrates for controlling the switching element, second signal wiring opposite to the first signal wiring and provided between the substrates for applying a voltage to the liquid crystal layer, and at least one transfer section for electrically connecting the first signal wiring or the second signal wiring and the substrate opposite to the first signal wiring or the second signal wiring via the conductive particles.

With the foregoing structure, the first signal wiring or the second signal wiring, and a substrate opposite to the first signal wiring or the second signal wiring, are electrically connected via the conductive particles by the transfer section. Namely, the first signal wiring and the substrate opposite to the first signal wiring, or the second signal wiring and the substrate opposite to the second signal wiring are electrically connected. Commonly, active driving has a wider permitted limit of contact resistance variation in the adjacent transfer sections than that of passive driving. Therefore, it becomes possible to provide a liquid crystal display device of lower cost since active driving requires less volume of the conductive particles than that of passive driving.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1(*b*) is a plan view showing an arrangement of relevant part of a counter substrate used for the liquid crystal display device.

FIG. 1(*c*) is a plan view showing an arrangement of relevant part of the liquid crystal display device.

FIG. 1(*d*) is a cross-sectional view, taken along the line A–A' of FIG. 1(*c*).

FIG. 1(*e*) is a cross-sectional view, taken along the line B–B' of FIG. 1(*c*).

FIG. 2(*b*) is a cross-sectional view, taken along the line C–C' of FIG. 2(*a*).

FIG. 2(*c*) is a cross-sectional view, taken along the line D–D' of FIG. 2(*a*).

FIG. 2(*d*) is a drawing showing a staggered arrangement of the transfer section of the liquid crystal display device of FIGS. 1(*a*) through 1(*e*).

FIG. 2(*e*) is a cross-sectional view, taken along the line E–E' of FIG. 2(*d*).

FIG. 2(*f*) is a cross-sectional view, taken along the line F–F' of FIG. 2(*d*).

FIG. 3(*b*) is an explanatory view showing an input waveform of a gradation signal line in active driving.

FIG. 3(*c*) is an explanatory view showing potentials of a common line and a segment line in the case of black display in passive driving.

FIG. 3(*d*) is an explanatory view showing potentials of a common line and a segment line in the case of white display in passive driving.

FIG. 3(*e*) is an explanatory view showing input waveforms of signals to the common line and the segment line in passive driving.

FIG. 6(*d*) is a drawing showing a detailed arrangement of the sealing section after the substrates are combined.

FIG. 8(*b*) is a cross-sectional view, taken along the line G–G' of FIG. 8(*a*).

FIG. 8(*c*) is a cross-sectional view, taken along the line H–H' of FIG. 8(*a*).

FIG. 8(*d*) is a drawing showing a staggered arrangement of the transfer section of FIG. 8(*a*) in detail.

FIG. 8(*e*) is a cross-sectional view, taken along the line I–I' of FIG. 8(*d*).

FIG. 8(*f*) is a cross-sectional view, taken along the line J–J' of FIG. 8(*d*).

FIG. 9(*b*) is a plan view showing an arrangement of relevant part of the liquid crystal display device in the case where the insulation films are formed in the sealing section.

FIG. 9(*c*) is a cross-sectional view, taken along the line K–K' of FIG. 9(*b*).

FIG. 9(*d*) is a cross-sectional view, taken along the line L–L' of FIG. 9(*b*).

FIG. 10(*b*) is a cross-sectional view, taken along the line M–M' of FIG. 10(*a*).

FIG. 10(*c*) is a cross-sectional view, taken along the line N–N' of FIG. 10(*a*).

FIG. 10(d) is a drawing showing a staggered arrangement of the transfer section of the liquid crystal display device of FIGS. 9(a) through 9(d) in detail.

FIG. 10(e) is a cross-sectional view, taken along the line O–O' of FIG. 10(d).

FIG. 10(f) is a cross-sectional view, taken along the line P–P' of FIG. 10(d).

FIG. 21(a) is a plan view schematically showing an arrangement of a glass substrate of the active matrix liquid crystal display device shown in FIG. 20.

FIG. 21(b) is a plan view schematically showing an arrangement of a counter substrate of the active matrix liquid crystal display device shown in FIG. 20.

FIG. 21(c) is a plan view showing an arrangement when a TAB is mounted onto the active matrix liquid crystal display device shown in FIG. 20.

FIG. 21(d) is a cross-sectional view, taken along the line W–W' of FIG. 21(c).

DESCRIPTION OF THE EMBODIMENTS

[First Embodiment]

Figure 1:
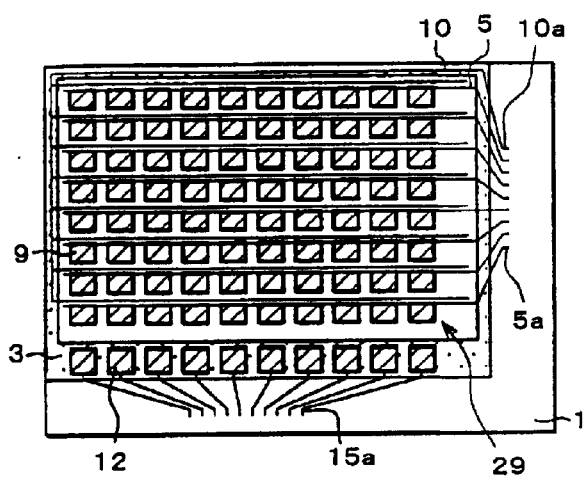
FIG. 1(*a*) is a plan view showing an arrangement of the major part of a glass substrate used for a liquid crystal display device according to one embodiment of the present invention.
Figure 1:
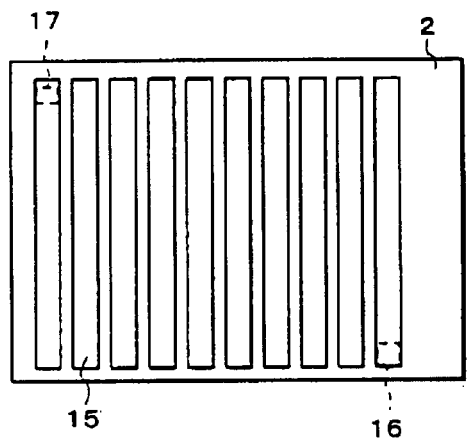
Figure 1:
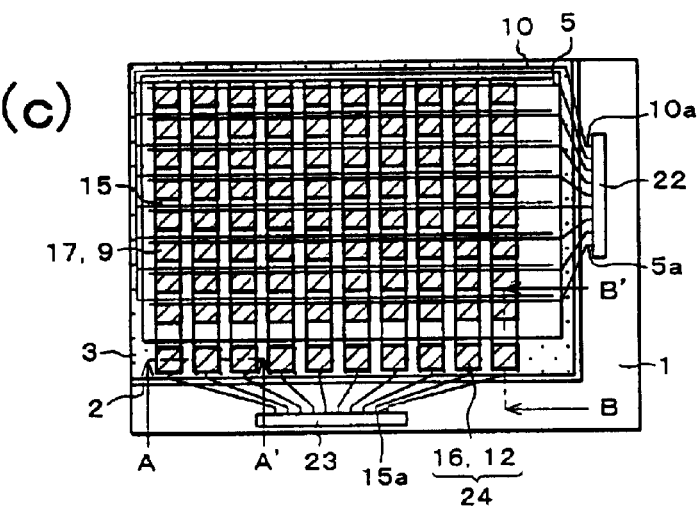
Figure 1:
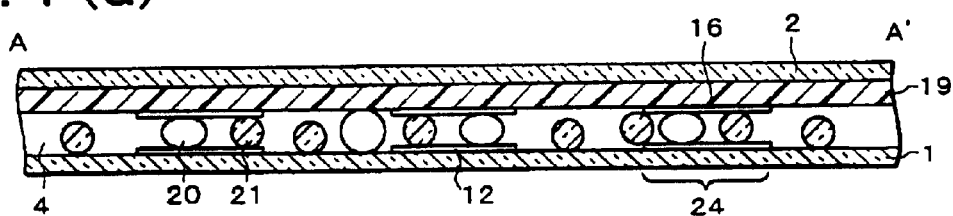
Figure 1:
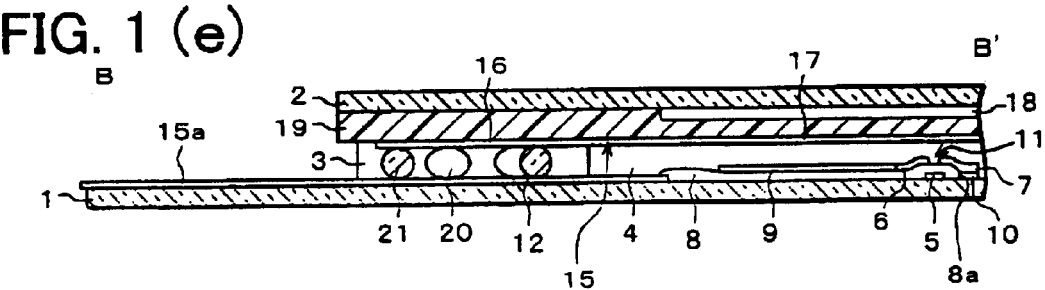
Figure 2:
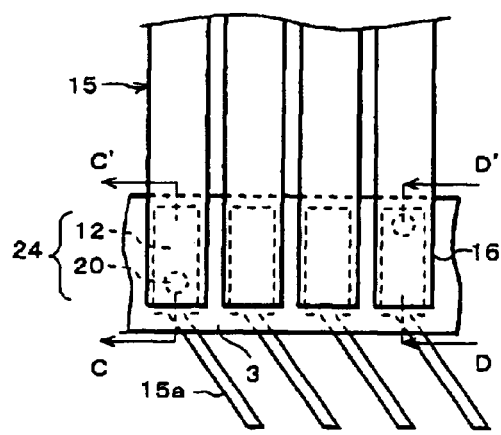
FIG. 2(*a*) is a drawing showing a transfer section of the liquid crystal display device of FIGS. 1(*a*) through 1(*e*) in detail.
Figure 2:
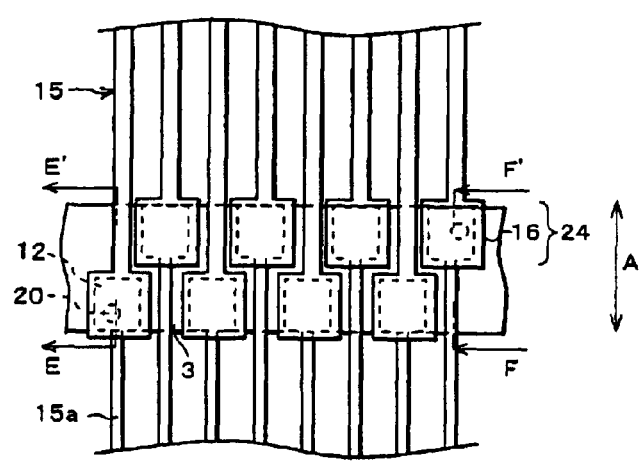
Figure 2:
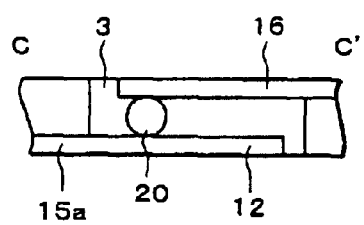
Figure 2:
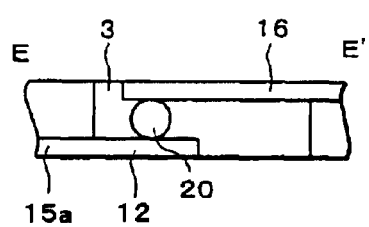
Figure 2:
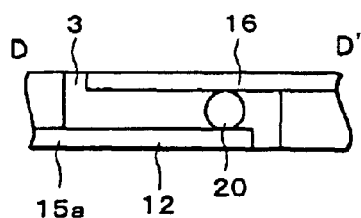
Figure 2:
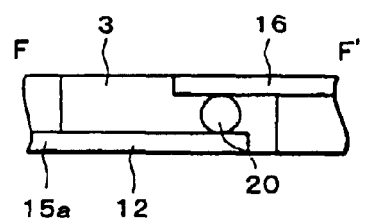
Figure 3:
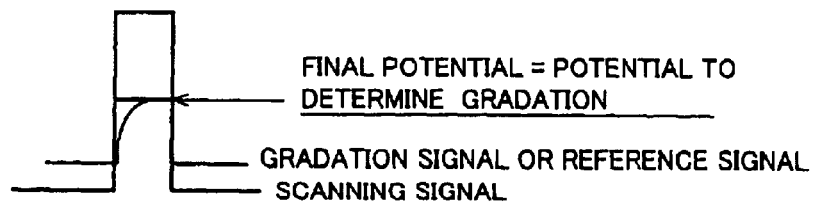
FIG. 3(*a*) is an explanatory view showing a potential of a scanning signal, and a gradation signal or a reference signal, in active driving.
Figure 3:
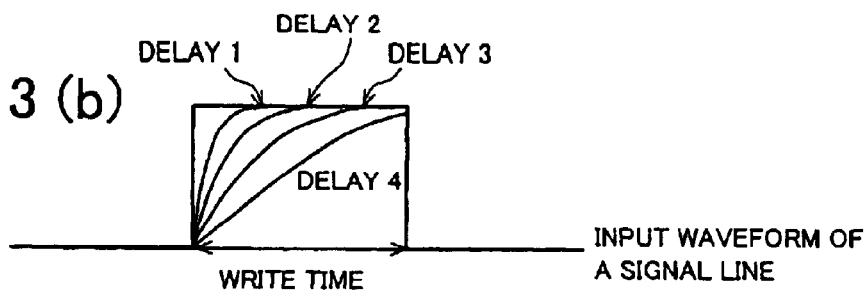
Figure 3:
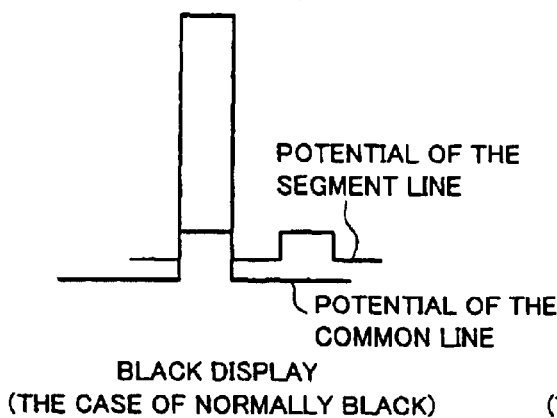
Figure 3:
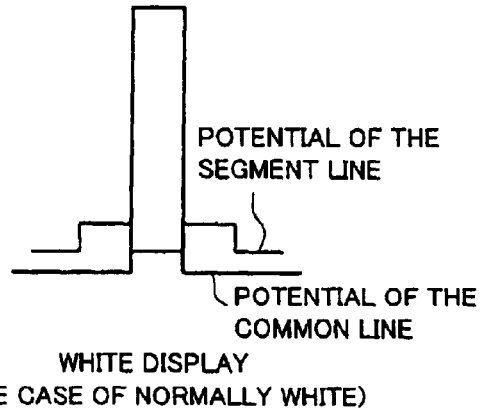
Figure 3:
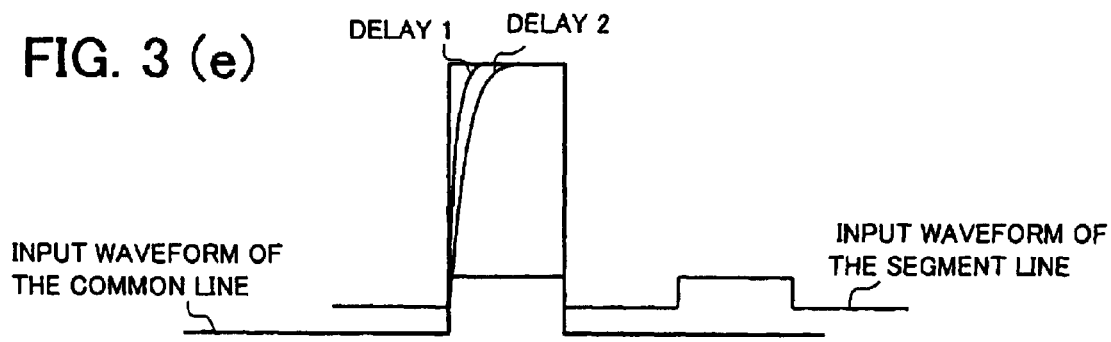

The following will explain one embodiment of the present invention with reference to FIGS. 1 through 12, and FIG. 17.

As shown in FIG. 1(e), a liquid crystal display device includes a glass substrate 1 made of glass (a substrate having switching elements, first substrate) and a counter substrate 2 (second substrate) which are opposed via a sealing section 3, the both substrates 1 and 2 are sealed with liquid crystal constituting a liquid crystal layer 4 as a medium layer.

Further, on the glass substrate 1 which is an active matrix substrate, thin film transistors 11 (hereinafter referred to as a TFT), pixel electrodes 9, reference signal lines 10 and lower contact pads 12 (first contact pad) are provided. Note that, the TFT 11 includes a scanning line 5 (first signal wiring), a drain electrode 6, a reference electrode 7 and a silicon nitride film 8.

The pixel electrodes 9 are disposed in a matrix manner, and the TFT 11 which is a switching element having three terminals is provided for each pixel electrode 9. TFTs 11 are also disposed in a matrix manner corresponding to the pixel electrodes 9.

In the TFT 11 which are horizontally (in a column direction) aligned in the display, the gate electrodes are connected to the same scanning line 5. The pixel electrodes 9 are connected to the drain electrodes 6. Further, in the TFTs 11 which are horizontally (in a column direction) aligned in the display, reference electrodes 7, which are source electrodes of the TFTs 11, are connected to the same reference signal line 10.

Further, an intrinsic semiconductor layer and an active semiconductor layer (not shown) are formed on the gate electrodes. The intrinsic semiconductor layer is a channel section of the TFTs 11, and also a current path connecting the drain electrode 6 and the reference electrode 7 which are formed thereon. The active semiconductor layer executes contact between the drain electrodes 6 and the reference electrodes 7.

The silicon nitride film 8 is a gate insulation film which is formed on substantially the entire surface of the glass substrate 1 so as to cover the scanning lines 5. The silicon nitride film 8 includes an opening 8a. The reference signal lines 10 are partly exposed in the opening 8a to be connected to the reference electrodes 7.

The reference electrodes 7, the drain electrodes 6 and the pixel electrodes 9 are made of a transparent conductive film such as ITO (Indium Tin Oxide) or the like.

The scanning lines 5 are disposed parallel to the reference signal lines 10, and as shown in FIG. 1(c), input terminals 5a of the scanning lines 5 and input terminals 10a of the reference signal lines 10 are connected to a driving IC 22 (first signal generation circuit).

Further, as shown in FIG. 1(a), the lower contact pads 12 are disposed so as to enclose a display area 29, parallel to the scanning lines 5. The lower contact pads 12 form a transfer section 24 in conjunction with upper contact pads 16 (described later), and are connected to input terminals 15a of gradation signal lines 15 (described later) which are connected to a driving IC 23 (second signal generation circuit) (see FIG. 1(c)). Here, the input terminals 15a of the gradation signal lines 15 also act as routing wiring of the gradation signal lines 15.

The scanning lines 5, the input terminals 5a, the reference signal lines 10, the input terminals 10a, the lower contact pads 12 and the input terminals 15a are all made of Ta, and are formed in the same manufacturing step.

Note that, the scanning lines 5, the input terminals 5a, the reference signal lines 10, the input terminals 10a, the lower contact pads 12 and the input terminals 15a may be made of any kinds of metal, for example, Al, Cr, Ti, Mo, Cu or the like.

On the other hand, as shown in FIG. 1(e), a color filter layer 18 having color filters of red, blue, green and a black matrix is provided on the counter substrate 2. An overcoat film 19 is formed so as to cover the color filter 18. Further, the gradation signal lines 15 (second signal wiring), upper contact pads 16 (second contact pad) and counter electrodes 17 are formed on the overcoat film 19.

The gradation signal lines 15 are data lines to which a data signal is supplied, and are orthogonally disposed to the scanning lines 5 on the glass substrate 1. In this arrangement as shown in FIG. 1(b), the gradation signal lines 15 also act as the counter electrodes 17 at the portion opposite the pixel electrodes 9, and also, act as the upper contact pads 16 at the portion opposite the lower contact pads 12.

The gradation signal lines 15 are made of transparent conductive film such as ITO or the like. Namely, the counter electrodes 17 are transparent electrodes made of ITO or the like. The counter electrodes 17 and the pixel electrodes 9 are opposed via the liquid crystal layer 4, and the counter electrodes 17 drive the liquid crystal in conjunction with the pixel electrodes 9. Further, the upper contact pads 16 are also made of a transparent conductive film such as ITO or the like.

Further, as shown in FIG. 1(a), the sealing section 3 for sealing the liquid crystal makes up the liquid crystal layer 4 is provided so as to enclose the display area 29 which between the glass substrate 1 and the counter substrates 2. The sealing section 3 is made of a sealing material of ultraviolet setting resin and has spacers 21 and conductive particles 20 as shown in FIG. 1(d). It is preferable that the sealing material is a thermosetting epoxy resin for example.

The transfer section 24 is made up of the conductive particles of the sealing section 3, the lower contact pads 12, and the upper contact pads 16.

The following will explain the details of the transfer section 24.

The spacers 21 of the sealing section 3 controls the cell thickness according to its diameter. The spacers 21 is made of glass or the like, and is not elastic. It is preferable that the spacers 21 as a sealing material is made of, for example, a glass fiber having a diameter of 6 $\mu$m, which is contained at the proportion of 1 wt %. The thickness of the cell is determined by the diameter of the spacers 21 which exists in the thickest area of the sealing section 3.

Further, the conductive particles 20 have a diameter greater than that of the spacers 21, and made of, for example, a spherical elastic resin particle coated with a conductive material such as Ni, Au or the like. It is preferable that the sealing material is prepared by deaerating resin particles having s gold-plated surface of about 0.1 $\mu$m, and evenly mixing them with elastic conductive particles 20 to 1 wt %, for example.

The upper contact pads 16 are electrically connected to the lower contact pads 12 via the conductive particles 20. Namely, the gradation signal lines 15 transfer to the glass substrate 1 via the transfer section 24.

The following will explain the behavior of the conductive particles 20 in the sealing material when combining the glass substrate 1 and the counter substrate 2, with reference to FIGS. 6(a) through 6(c).

A thermosetting material to make up the sealing section 3 is prepared by mixing and stirring the spacers 21 and the conductive particles 20 in the thermosetting material until the spacers 21 and the conductive particles 20 are evenly distributed in the material. Thereafter, the sealing material is applied on, for example, the glass substrate 1, for example, by printing (FIG. 6(a)). Here, the conductive particles 20 are distributed while being stacked one over another in the sealing material.

Next, after the glass substrate 1 and the counter substrate 2 are mated, suitable pressure is applied to deform the conductive particles 20 (FIG. 6(b)). At this point, the conductive particles 20 are distributed at random on a single surface as the sealing material spreads in the cell until the thickness of the cell becomes the same as the diameter of the conductive particles 20.

The conductive particles 20 are further deformed when more pressure is applied (FIG. 6(c)). Then, the conductive particles 20 are fixed in position when they are deformed to the thickness approximately equals to the cell thickness to be held by the spacers 21, i.e., the diameter of the spacers 21.

Here, the sealing section 3 also spreads as the conductive particles 20 are deformed, and it stops spreading when the conductive particles 20 are deformed to the thickness approximately equal to the cell thickness to be held by the spacers 21. The glass substrate 1 and the counter substrate 2 in this state are bonded and fixed by heating. Note that, FIG. 6(d) is a plan view of the sealing section 3 as viewed from the side of the glass substrate 1. Further, the conductive particles 20 are required to have a size or a diameter greater than the cell thickness, i.e., the distance between the upper contact pad 16 and the lower contact pad 12, so that the conductive particles 20 can slightly be deformed at a portion where the upper contact pads 16 and the lower contact pads 12 are electrically connected to each other.

This makes it possible to create an area W1 (see FIG. 6(d)) of the edge of the sealing section 3 where the conductive particles 20 do not exist. Note that, the area W1 varies depending on the applied volume of the sealing material, the diameter of the conductive particles 20 and the diameter of the spacers 21. Here, in the case where the conductive particles 20 and the spacers 21 have the same diameter, the area W1 cannot be created since the conductive particles 20 are not deformed and the sealing section 3 does not spread. Accordingly, the diameter of the conductive particles 20 must be greater than that of the spacers 21.

Note that, the input terminals 5a, 10a and 15a may be provided on the counter substrate 2. In this case, the scanning lines 5 and the reference signal lines 10 transfer to the counter substrate 2 via the transfer section 24.

As described, since the glass substrate 1 and the counter substrate 2 are bonded and fixed, the elastic conductive particles 20 are deformed to some extent between the glass substrate 1 and the counter substrate 2 as shown is FIG. 1(e). This makes it possible to provide a sufficient contact area for the upper contact pads 16 and the lower contact pads 12, thereby ensuring desirable electrical conduction. Consequently, it is possible to reduce the contact resistance between the upper contact pads 16 and the lower contact pads 12, thereby suppressing blunting of signals to the gradation signal lines 15.

Further, generally, in comparison with STN-LCDs, a voltage-hold type liquid crystal display element which is used for active matrix liquid crystal display devices shows greater degradation of image quality caused by degradation with time of the voltage-hold capability for liquid crystal. The degradation with time of voltage-hold capability for liquid crystal is caused by flowing out of impurities from the sealing material, or ionization of ions.

However, as described, when the area W1 which does not have the conductive particle 20 is created at the edge of the sealing section 3, and when the width of the area W1 is at or greater than 50 μm, in other words, when the conductive particles 20 are provided only in the area which is at least 50 μm far from the interface between the liquid crystal layer 4 and the sealing section 3, it is possible to prevent a decrease in voltage-hold capability for liquid crystal and non-uniform display in the vicinity of the sealing section 3, which are caused by elution of impurities from the sealing material, or ionization of ions. Therefore, the degradation with time of voltage-hold capability for liquid crystal can be prevented, thereby making it possible to provide a liquid crystal display with stable reliability. Further, contamination does not occur in manufacture since the conductive particles 20 do not seep out of the sealing section 3.

Note that, the transfer sections 24 may be disposed parallel to the scanning lines 5 as shown in FIG. 1(c), FIG. 2(a). However, in the case where the transfer sections 24 have a narrow pitch and are required to perform transfer in a small area, the transfer section 24 may have a staggered arrangement as shown in FIG. 2(d). To be more specific, the transfer sections 24 may be disposed alternately along the both edges of the width of the sealing section 3, and the width of the gradation signal lines 15 may be narrower than that of the upper contact pads 16.

Further, the transfer section 24 is provided between the driving IC 23, and the gradation signal lines 15 and the scanning lines 5. This makes it possible to downsize a routing wiring section of the gradation signal lines 15 and thus reduce the frame area (non-display area) in the liquid crystal display device, thereby realizing a liquid crystal display device with a smaller frame.

As described, the input terminals 15a of the gradation signal lines 15, the input terminals 5a of the scanning lines 5 and the input terminals 10a of the reference signal lines 10 are provided on the glass substrate 1. This makes it possible to mount both the driving IC 22 and the driving IC 23 on the glass substrate 1, in other words, it is possible to mount those on a single substrate.

Accordingly, in the mounting process of a TAB (tape automated bonding) on a liquid crystal panel which is a base substrate of the driving ICs 22a and 23a, it becomes possible to continuously mount the driving ICs 22 and 23, which are for inputting signal voltages to the scanning lines 5, the reference signal lines 10 and gradation signal lines 15, on a portion of the input terminals 15a, 5a and 10a to be connected to the driving ICs 22a and 23a, without turning over the liquid crystal display element. Also, it is possible to mount a TAB for inputting signal voltages to the scanning lines 5, the reference signal lines 10 and gradation signal lines 15, on a connecting portion of the TAB. This increases the efficiency of mounting procedure, thereby reducing manufacturing cost.

Further, since the input terminals (15a, 5a, 10a) for wires bearing the driving IC 22 and 23, the TAB, etc., are provided on a single substrate, by the wire routing shown in FIGS. 12(a) and 12(b), the driving IC 26 can be provided as a single chip. This makes the mounting compact in size, thereby reducing the cost of the element required for the driving IC 26 and manufacturing cost.

Further, it is possible to provide the input terminals 15a on the glass substrate 1 made of glass (on the glass surface, or on an organic film deposited on the glass substrate) instead of providing it on the overcoat film 19 made of resin and formed on the counter substrate 2. This improves the mechanical strength and the adhesion between the input terminals 15a and the glass substrate 1, and also protects the terminals from breakage when handling. Also, this makes re-work of mounting easier in case of mounting of the TAB, etc. is failed, thereby improving the yield.

Further, as with the terminals 5a and the terminals 10a, the input terminals 15a are made of a metal film such as Ta or the like on the glass substrate 1 which has the TFTs 11. Generally, since a metal film is of a smaller resistance than a transparent conductive film such as ITO, it is possible to narrow the width of the terminals 15a, in other words, it is possible to narrow a wiring pitch and create a COG (Chip on glass) structure with a narrow pitch, as compared with the case where the input terminals 15a are made of a transparent conductive film such as ITO, which is the same material used for the counter electrodes 17 and the gradation signal lines 15, on the counter substrate 2. Further, it also is possible to reduce the frame area (non-display area) of the liquid crystal display element, i.e., a narrow frame is attained. This provides a liquid crystal display device with a narrower frame, makes the mounting compact in size, and reduces the mount area.

Further, since the scanning lines 5 and the gradation signal lines 15 do not intersect on a single substrate, poor connection due to breakage of those wires does not occur, and the yield is improved, thereby providing a liquid crystal display device with high reliability.

The following will explain a driving principle of liquid crystal.

The liquid crystal display device sequentially scans time-shared display data along the scanning lines 5 to display an image on a screen.

For example, when a scanning line 5 is horizontally scanned, a gate voltage for turning on the TFTs 11 is applied to this scanning line 5. Meanwhile, a gate voltage for turning off the TFTs 11 is applied to the other scanning lines 5. Thus, when a scanning line 5 is horizontally scanned, only the TFTs 11 of this scanning line 5 are turned on, and a pixel voltage which is applied to the reference signal lines 10 is applied to the pixel electrodes 9 of the scanning line 5 via the reference electrode, which is a source electrode, and the drain electrode 6. At this time, the charge supplied to the pixel electrodes 9 is accumulated in a capacitor. Further, a signal voltage (data signal) applied to the gradation signal lines 15 is applied to the liquid crystal layer 4 by the counter electrode 17. With these processes, the liquid crystal on each pixel electrode 9 is driven by the potential difference between the pixel voltage applied to the pixel electrode 9, and the signal voltage applied to the counter electrode 17.

The following will explain an example of the manufacturing processes of the liquid crystal display device.

Firstly, a metal film of Ta or the like is deposited on the glass substrate 1 by a sputtering method. Then, the metal film is patterned into a desired shape by a photo-lithography method, so as to form the scanning lines 5, an input terminal 5a of the scanning lines 5, the reference signal lines 10, the input terminals 10a of the reference signal lines 10, the lower contact pads 12 and the input terminals 15a of the gradation signal lines 15. Here, the input terminals 15a and the lower contact pads 12 are formed into a continuous pattern to be electrically conductive each other.

Secondly, a silicon nitride film 8 is deposited on the substantially the entire surface of the glass substrate 1 so as to cover the scanning lines 5 using plasma CVD (Chemical Vapor Deposition). Thereafter, the silicon nitride film 8 is patterned by the photo-lithography method so as to remove the area of the silicon nitride film 8 on the input terminals 5a, the input terminals 10a, the input terminals 15a, and the reference electrodes 7 where the reference signal lines 10 will be formed later. Thus, an opening 8a is formed on the area of the reference signal lines 10 where the reference electrodes 7 will be formed.

Next, the intrinsic semiconductor layer (not shown) made of non-doped amorphus silicon, and the active semiconductor layer doped with P (phosphor) are continuously deposited using plasma CVD on the scanning lines 5, or the gate electrodes (not shown) which are electrically connected to the scanning lines 5. Then, the intrinsic semiconductor layer and the active semiconductor layer are patterned into land shapes by the photo-lithography method.

Next, after depositing an ITO film, which is a transparent conductive film by a sputtering method, the ITO film is patterned into a desirable shape using a photo-lithography method, so as to form the reference electrodes 7, the drain electrodes 6 and the pixel electrodes 9. At this time, a portion (channel section) of the active semiconductor layer between the reference electrodes 7 and the drain electrodes 6 is removed. Here, the drain electrodes 6 and the pixel electrodes 9 are formed into a continuous pattern to be electrically conductive each other. Further, since the opening 8a is provided by removing the silicon nitride film 8 on the area of the reference signal lines 10 where the reference electrodes 7 will be formed, the reference electrodes 7 are electrically connected to the reference signal lines 10.

With the foregoing processes, the TFTs 11 made up of the scanning lines 5, the drain electrodes 6 and the reference electrodes 7 can be formed together with the reference signal lines 10, the pixel electrodes 9, the input terminals 5a, 10a, 15a, and the lower contact pads 12.

Further, an alignment film (not shown) is formed by printing, and is aligned by rubbing. Then, plastic beads (not shown), which are spacers to keep the cell thickness in the display area 29 even, are distributed over the alignment film.

Meanwhile, after the ITO film which is a transparent conductive film is deposited on the counter substrate 2 by a sputtering method, the ITO film is patterned into a desirable shape using a photo-lithography method so as to form the counter electrodes 17, the gradation signal lines 15 and the upper contact pads 16. Here, the counter electrodes 17, the gradation signal lines 15 and the upper contact pads 16 are formed into a continuous pattern to be electrically conductive each other. Note that, at this time, the counter substrate 2 should have a color filter layer 18 made up of a black resin layer and color layers of red, blue and green, and an overcoat film 19 made of flat and chemical resistant resin, which are formed on the counter substrate 2 in advance. Further, an alignment film (not shown) is formed by printing, and then aligned by rubbing.

Next, the counter substrate 2 is coated with a sealing material by printing, and then combined with the glass substrate 1 after pre-baking the counter substrate 2 for 10 minutes at 110° C. Thereafter, the two substrates are calcined for about 90 minutes at 180° C. while applying 2 kg/cm$^2$ pressure. Further, the two substrates are sealed with a sealing material after injecting liquid crystal between them. Through the foregoing processes, the glass substrate 1 and the counter substrate 2 are bonded and fixed to be completed as a liquid crystal panel. Note that, a dispenser may be used to coat the counter substrate 2 with the sealing material.

Next, after a test for checking the lightning of the liquid crystal panel, the driving IC 22 is mounted on the input terminals 5a and 10a, and also, the driving IC 23 is mounted on the input terminals 15a to form the liquid crystal display element.

Further, polarizers (not shown) are provided on the both sides of the liquid crystal display element, and a light source made up of a cold cathode tube, a diffusing plate, a light guide plate, a reflector, a control substrate, etc., are provided to complete the liquid crystal display device.

In this manner, since the terminals 15a can be formed in the process of forming the scanning lines 5 and the reference signal lines 10, an extra manufacturing step will not be necessary.

The following will explain distribution volume of the conductive particles 20 in the sealing section 3. The volume of the conductive particles 20 to be distributed in the sealing section 3 is determined by a permitted limit of resistance variation in the transfer sections 24 and the number of the conductive particles 20 which causes a decrease of adhesion of the sealing section 3, a decrease of evenness of the cell thickness, and an increase of leakage between the wiring caused by aggregation of the conductive particles 20.

Figure 17:
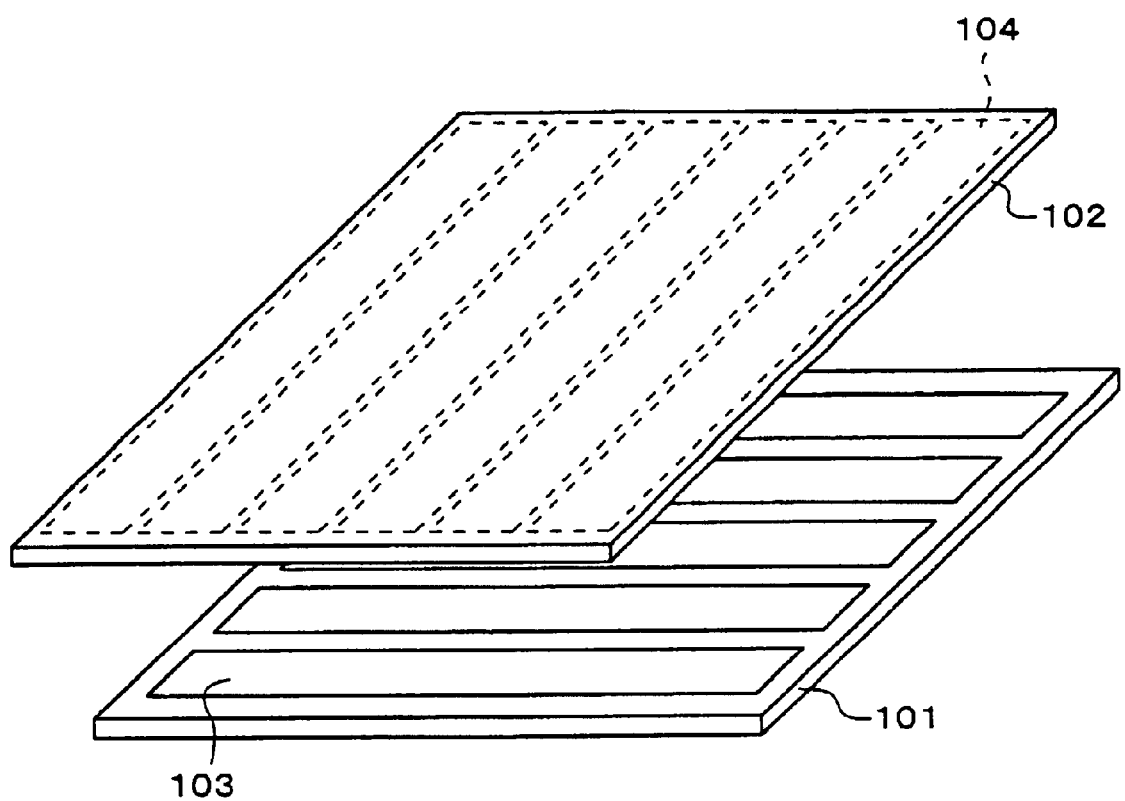
FIG. 17 is an exploded perspective view showing an arrangement of a conventional STN-LCD.
Figure 18:
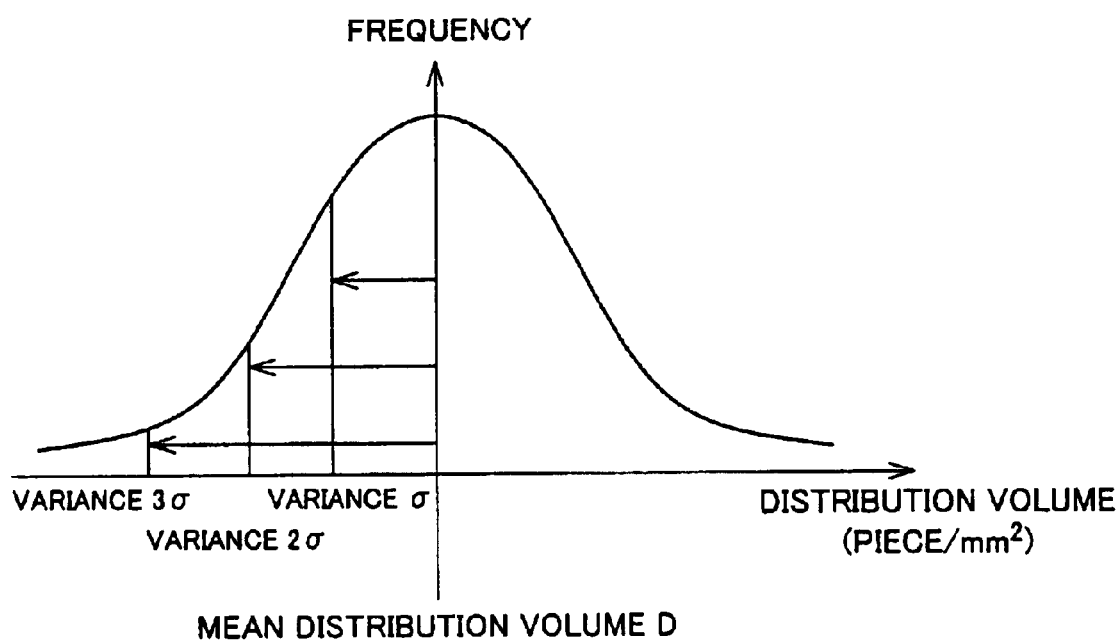
FIG. 18 is a distribution view showing a frequency of the distribution volume of conductive particles.
Figure 19:
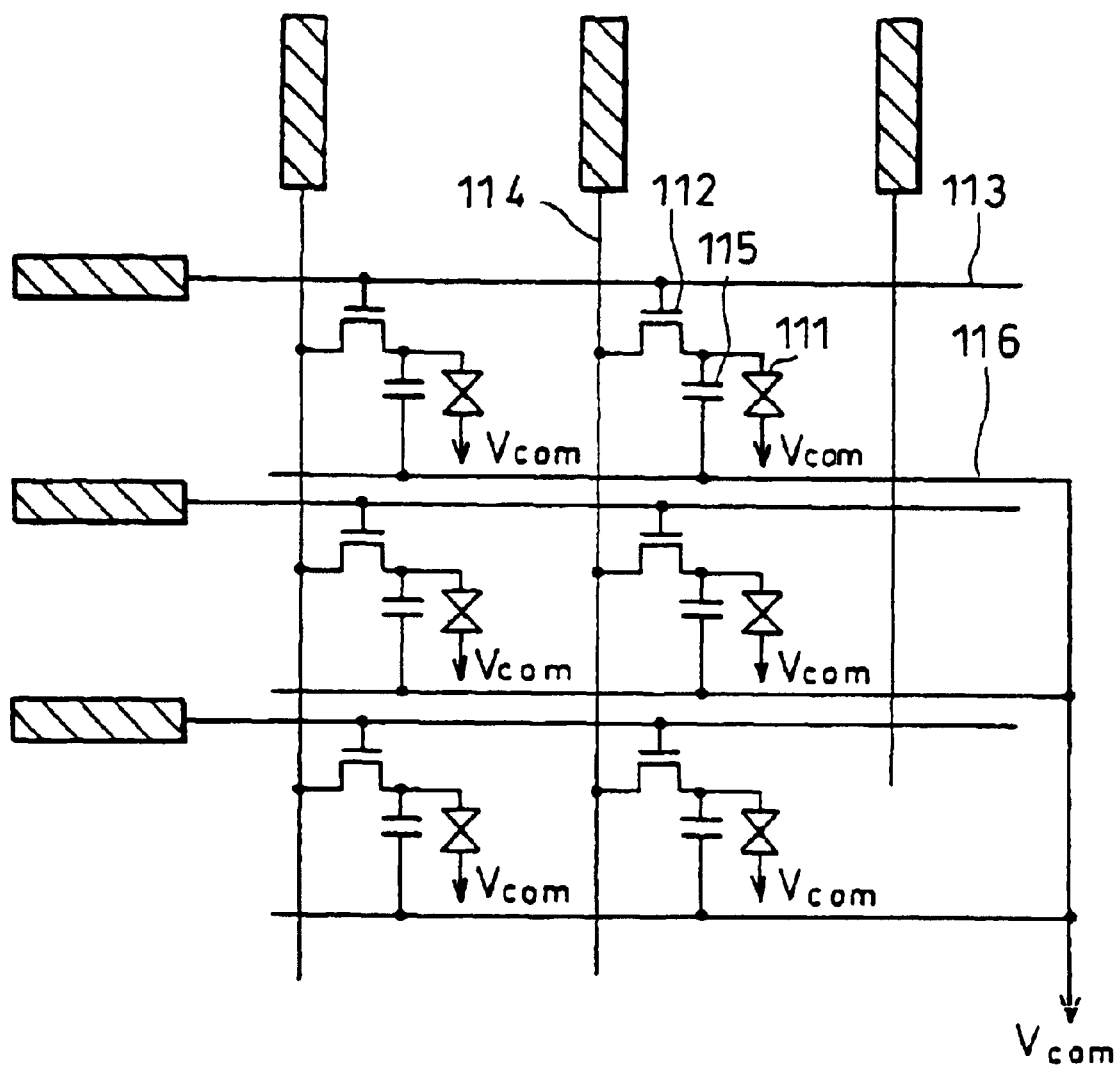
FIG. 19 is an equivalent circuit diagram of a conventional active matrix liquid crystal display device having a structure in which a common electrode is provided on a counter substrate.
Figure 20:
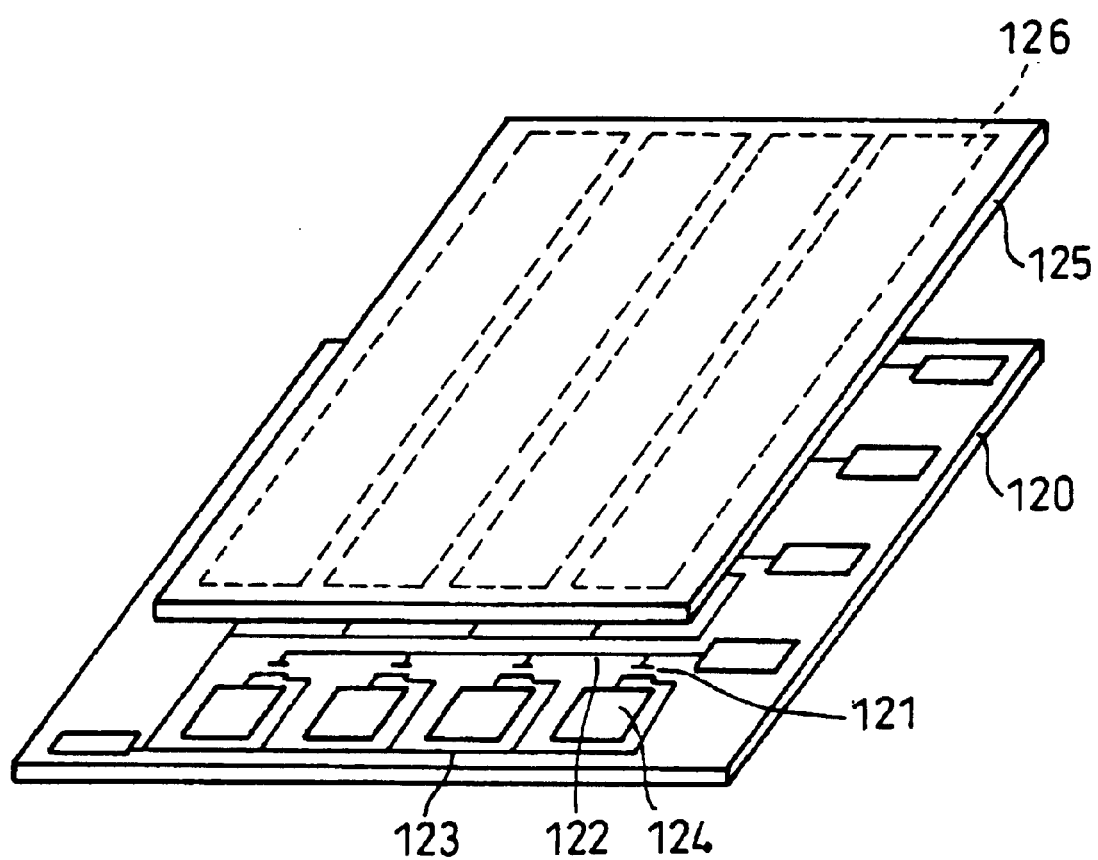
FIG. 20 is an exploded perspective view of a conventional active matrix liquid crystal display device having a counter matrix structure in which a data line is provided on a counter substrate.

Firstly, the following will explain how the permitted limit of signal delay caused by resistance variation at the transfer sections 24 between adjacent wires becomes different in passive driving as in the STN-LCD shown in FIG. 17, and in active driving as in the liquid crystal display device of the present embodiment shown in FIGS. 1(a) and 1(b), in deciding the mean distribution volume of the conductive particles 20.

In the case of active driving, as shown in FIG. 3(a), when the signal of the scanning line 5 is on, the counter electrode 17 and the pixel electrode 9 are charged to the same potential as that of the gradation signal line 15 or the reference signal line 10. Accordingly, the gradation of liquid crystal display element is determined by the final potential of the gradation signal line 15 or the reference signal line 10 when the signal of the scanning line 5 turns off. Therefore, in any of delay 1, delay 2 and delay 3 shown in FIG. 3(b), the gradation of the liquid crystal display element will be the same as long as the final potential is the same. However, when the final potential is different as indicated by delay 4, the gradation of the liquid crystal display element will be different. Nevertheless, even when there is a slight variation in contact resistance between adjacent wires (adjacent transfer sections 24), the displayed gradation of the liquid crystal display element will be the same as long as the final potential is the same, and uniformity of the display will not be lost even in the presence of a difference in signal delay.

On the other hand, as shown in FIGS. 3(c) and 3(d), in passive driving, gradation is expressed by the potential difference between the common lines 103 (see FIG. 17) and the segment lines 104 when the common lines 103 is on. Therefore, the dynamic range, which is the difference in the effective values of the white display and the black display is around 0.2 V, which is only 1/20 of that of active driving at 4 v. Further, as shown in FIG. 3(e), since the amplitude of a common signal of the common lines 103 is large in passive driving, the difference between delay 1 and delay 2 greatly affects the effective value of the liquid crystal.

In this manner, in passive driving, a difference of signal delay caused by a small variation of contact resistance between adjacent wires (adjacent segment lines 104) impairs uniformity of the display to cause non-uniform of the display. Note that, in passive driving, the common lines 103 corresponds to the scanning lines 5 in active driving, and the segment line 104 corresponds to the gradation signal lines 15 in active driving.

Aa described, the active driving has a wider permitted limit of variation of signal delay between adjacent wires, i.e., a wider permitted limit for the variation of contact resistance.

Figure 4:
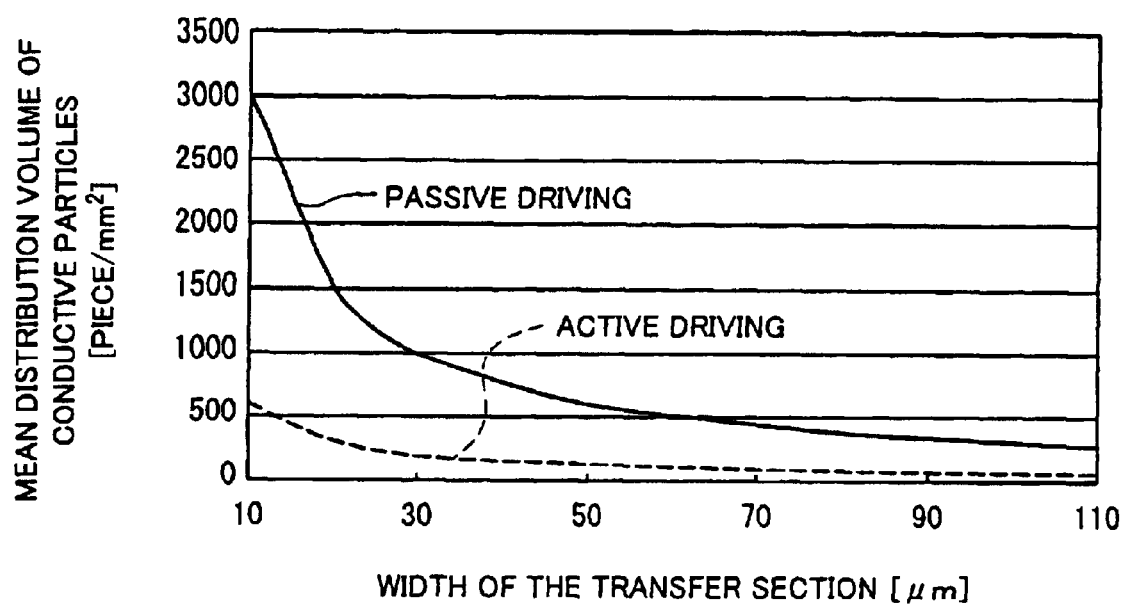
FIG. 4 is a graph showing a relation between width of the transfer section and mean distribution volume of the conductive particles.

Next, FIG. 4 shows how the permitted limit of variation differs in active driving and passive driving, and the required mean distribution volume of the conductive particles 20 for each driving.

Here, FIG. 4 assumes that the shape of the transfer section 24 is, for example, a rectangle in a direction parallel to the glass substrate 1, and one side of the rectangle is fixed to 1 mm. The graph of FIG. 4 shows the required mean distribution volume of the conductive particles 20 when the width of the transfer section, i.e., the area of the rectangle is varied.

As shown in the Figure, in the case of a liquid crystal panel having the transfer section 24 of 100 μm wide, the required volume of the conductive particles 20 is not less than 300/mm$^2$ in passive driving. On the other hand, the volume is not less than 60/mm$^2$ is only sufficient in active driving. Similarly, when the width of the transfer section 24 is 60 μm, the required volume of the conductive particles is not less than 500/mm$^2$ in passive driving, as opposed to not less than 100/mm$^2$ which is only sufficient in active driving. Further, when the width of the transfer section 24 is 30 μm, the required volume of the conductive particles 20 is not less than 1000/mm$^2$ in passive driving, as opposed to not less than 200/mm$^2$ which is only sufficient in active driving.

Figure 22:
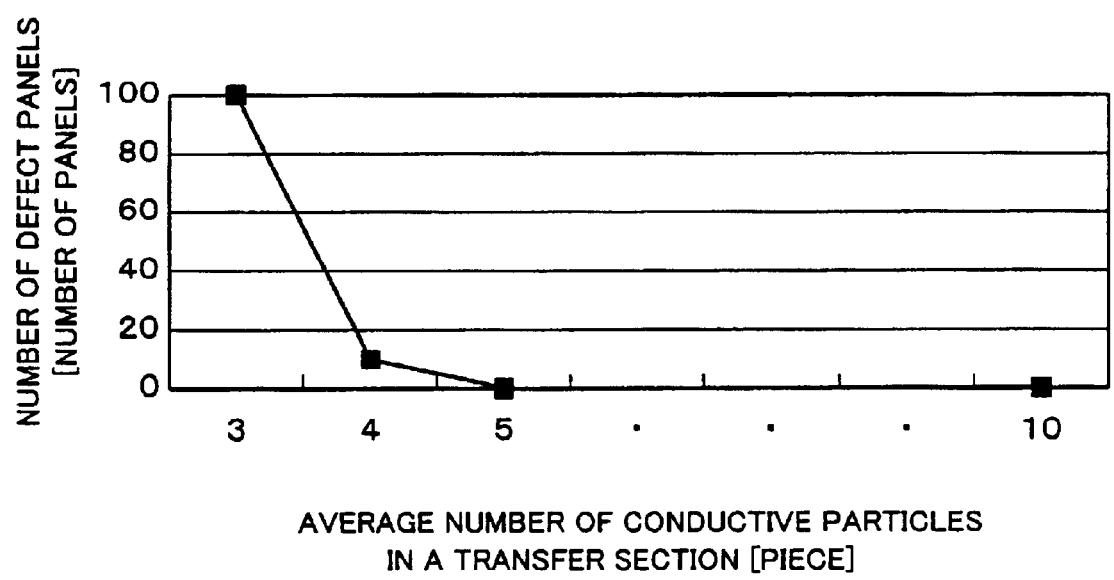
FIG. 22 is a graph showing a correlation between the average number of the conductive particles in the transfer section and occurrence of defect liquid crystal panels.

Further, Table 2 and FIG. 22 show a correlation between the average number of the conductive particles 20 in the transfer section 24 and occurrence of defect liquid crystal panels when the distribution volume of the conductive particles 20 is varied.

TABLE 2

| NUMBER OF CONDUCTIVE PARTICLE | NUMBER OF DEFECTS | JUDGEMENT |
| --- | --- | --- |
| 3 | 5/5 | x |
| 4 | 3/35 | x |
| 5 | 0/355 | o |
| . | . | . |
| . | . | . |
| . | . | . |
| 10 | 0/329 | o |

\* o = acceptable for commercial production
x = unacceptable for commercial production The table shows the result of an evaluation on average numbers of conductive particles when the mean distribution volume is varied and occurrence of lighting failures caused by transfer failure in a panel which was created for each different average number of conductive particles when transfer pad area S is 0.025 mm$^2$. Here, "transfer failure" refers to the case where there are no conductive particles 20 in the transfer section 24 so that electrical conduction fails, and the case where a deficiency such non-uniform display or the like is caused by a resistance variation even in the presence of the conductive particles 20. Note that, the evaluation was made under lighting conditions, and the panels used for the evaluation had 660 wires.

When the average number of the conductive particles 20 in the transfer section 24 was about three, all of the panels used for the evaluation had transfer points having no conductive particles 20, and showed transfer failure. Further, when the average number of the conductive particles 20 in the transfer section 24 was about four, three in thirty-five panels used for the evaluation showed transfer failure which is about 10% of the total. The transfer failure in this case was also caused by the absence of the conductive particles 20 in the transfer section 24.

On the other hand, when the average number of the conductive particles 20 in the transfer section 24 was about five, among three hundred fifty five panels evaluated, none of these panels showed transfer failure caused by the absence of the conductive particles 20 in the transfer section 24, or transfer failure due to non-uniform display which occurs even in the presence of the conductive particles 20. Likewise, when the average number of the conductive particles 20 in the transfer section 24 was about ten, among three hundred twenty-nine panels evaluated, none of these panels showed transfer failure.

Further, when the average number of the conductive particles 20 in the transfer section 24 was about five, there were no failures such as non-uniform display or the like which are caused by transfer of the conductive particles 20, even though some transfer points were found having only one conductive particles 20 were found. Thus, this result shows that a sufficient resistance can be provided when the transfer section 24 has at least one conductive particles 20.

Considering the transfer section 24 in view of these results, by determining and distributing distribution volume of the conductive particles 20 which is required to provide five particles in the transfer section 24 on average, the occurrence of failures can be suppressed almost completely to make it available for commercial production.

Namely, assuming that the mean distribution volume of the conductive particles 20 is D (piece)/mm$^2$, and the area of the transfer section 24 is S mm$^2$, it can be seen that the occurrence of failures can be suppressed almost completely when the distribution volume D (piece) of the conductive particles 20 is not less than 5/S.

Here, in the case where the mean distribution volume of the conductive particles 20 is too large, there arises problems such as a decrease of adhesion in the sealing section 3, uneven thickness of the cell, and an increase of leakage between the wires caused by aggregation of the conductive particles 20. Table 3 shows a relation between the mean distribution volume of the conductive particles 20 and occurrence of failures. Note that, in Table 3, the gap between wires (the distance between adjacent transfer sections 24) is 15 μm.

TABLE 3

| MEAN DISTRIBUTION VOLUME | LEAKAGE BETWEEN WIRES | ADHESION | CELL THICKNESS |
|---|---|---|---|
| 1600 | x | x | x |
| 1400 | x | x | x |
| 1200 | x | Δ | x |
| 1000 | o | Δ | Δ |
| 800 | o | Δ | Δ |
| 600 | o | o | Δ |
| 400 | o | o | o |
| 200 | o | o | o |

As shown in Table 3, when the mean distribution volume conductive particles 20 is 1200 (piece)/mm², the probability of leakage between wires is about 1%. On the other hand, when the mean distribution volume of the conductive particles 20 is 1000 (piece)/mm², the probability of leakage between wires does not exceed 1%, which poses no problem for commercial production of the liquid crystal display device. Further, when the mean distribution volume of the conductive particles 20 is further reduced, it is clearly understood that the probability of leakage between wires is also further lowered.

Figure 5:
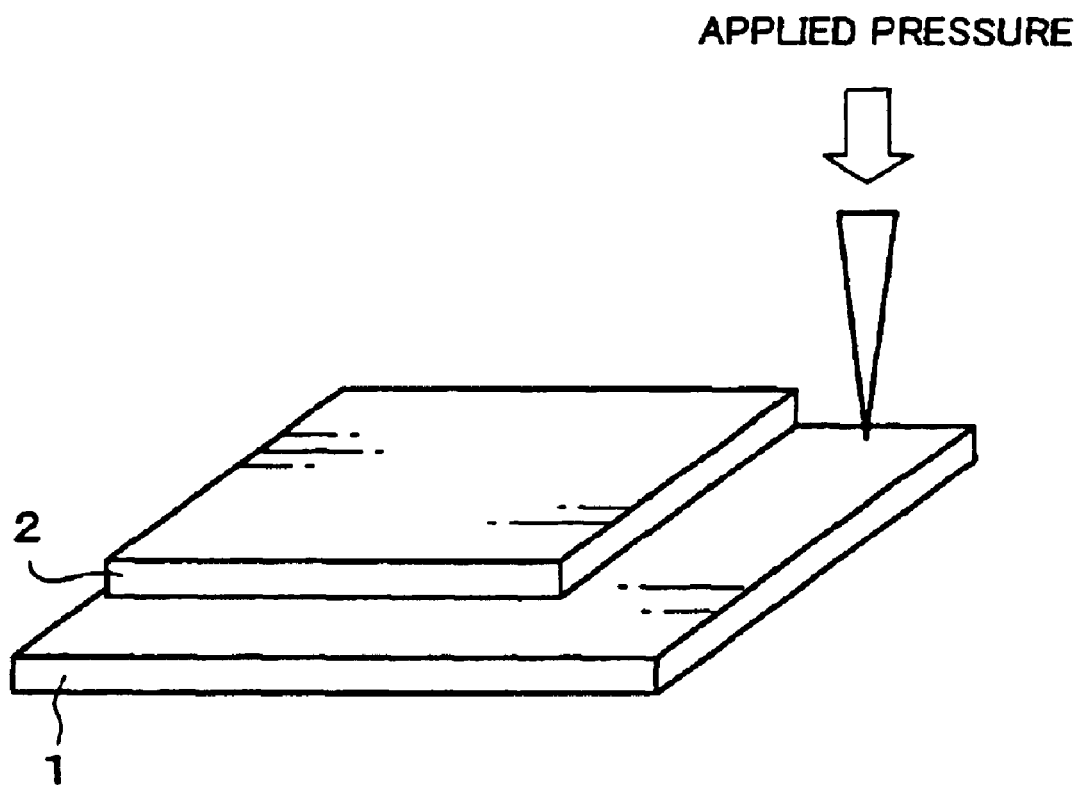
FIG. 5 is an explanatory view showing how a pressure test is carried out.
Figure 6:
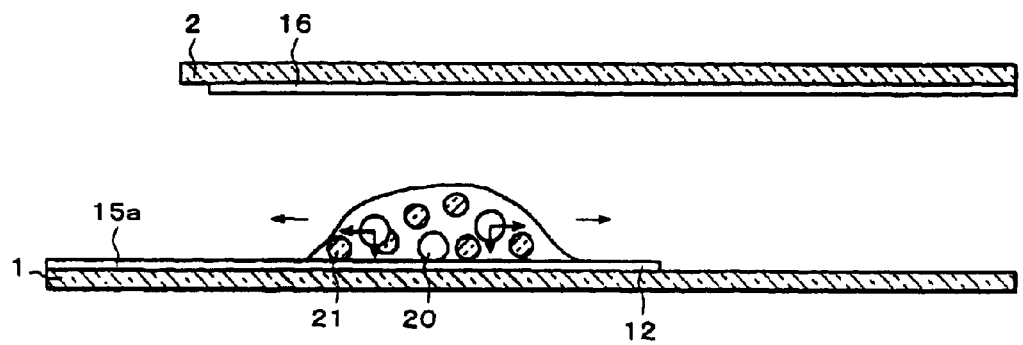
FIGS. 6(*a*) through 6(*c*) are explanatory views showing behavior of the conductive particles in a sealing material during a process of combining substrates.
Figure 6:
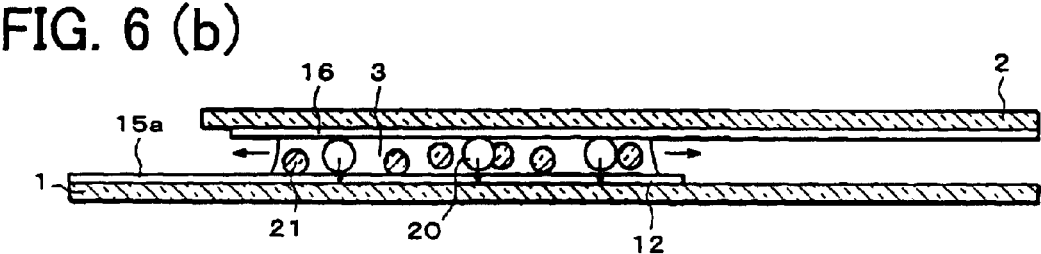
Figure 6:
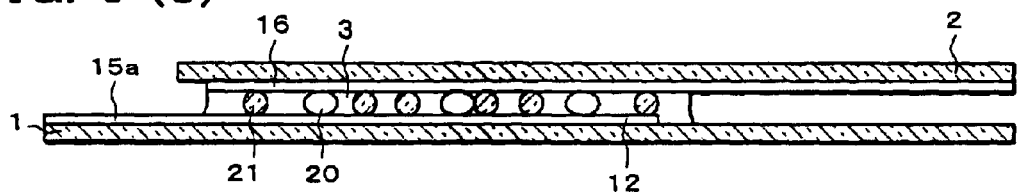
Figure 6:
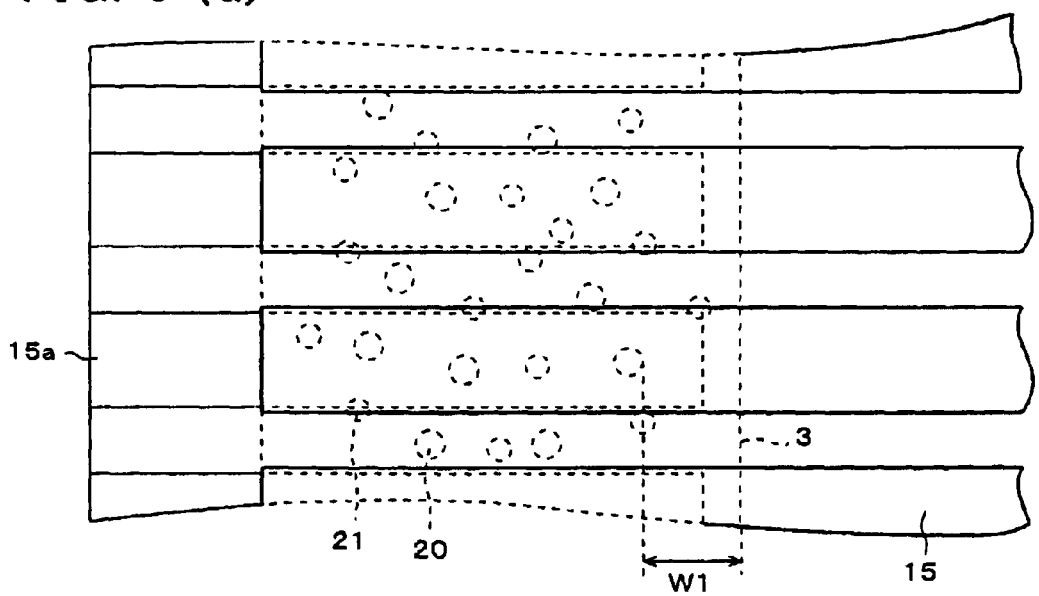

In a relation between the mean distribution volume of the conductive particles 20 and adhesion, the adhesion should be stronger than glass strength. More specifically, as shown in FIG. 5, when performing a pressure test which applies pressure on the portion indicated by the arrow after affixing the glass substrate 1 and the counter substrate 2 to find the pressure value which separates the two substrates, or breaks the glass substrate 1, it is preferable that the adhesion is firm enough to break the glass substrate 1 before the two substrates are separated at the sealing section 3.

If the adhesion is such that it is weaker than the glass strength, and causes separation of the two substrates in a cutting process or a chamfer process and the like which are necessary for creating the liquid crystal panel, it is difficult to create the liquid crystal panel with a desirable yield. This level of adhesion is denoted by x in the columns under ADHESION in Table 3. Meanwhile, if the two substrates stay joined in the foregoing manufacturing processes, it is possible to create the liquid crystal panel without lowering the yield. However, if the product liquid crystal panel fails, for example, the impact-strength test, it is necessary to reinforce the adhesion of the panel with silicon resin. This is not preferable because it increases the manufacturing cost. It is therefore preferable that the adhesion is stronger than the glass strength. In Table 3, the case where the adhesion is stronger than the glass strength is denoted by o, and the case where the adhesion is strong enough to create the liquid crystal panel but weaker than the glass strength is denoted by Δ.

As shown in Table 3, when the mean distribution volume of the conductive particles 20 is not more than 600 (piece)/mm², adhesion of the sealing section 3 is stronger than the glass strength. On the other hand, when the mean distribution volume of the conductive particles 20 is not less than 1400 (piece) /mm², the adhesion is weak enough to cause separation of the two substrates in the cutting process or the chamfer process and the like which are necessary after the glass substrate 1 and the counter substrate 2 have been combined. Further, when the mean distribution volume of the conductive particles 20 is 800 (piece)/mm² to 1200 (piece)/mm², adhesion of the sealing section 3 is weaker than glass strength but is strong enough to prevent separation in the cutting process or the chamfer process.

Further, as for evenness of the cell thickness, the following considers the case where the finished thickness of the cell is 4.5 μm for example, if the cell thickness has a variation of ±0.3 μm or greater, flicker is likely to occur since it is difficult to precisely join the glass substrate 1 and the counter substrate 2 because of unevenness of liquid crystal capacities. Further, if the cell thickness has a variation of ±0.5 μm or greater, the difference of the cell thickness becomes difference of transmittance which is perceived as non-uniform display.

Thus, in the evaluation of Table 3, the case where the absolute value of the variation of the cell thickness is not less than 0.5 μm is denoted by x, the case where the absolute value of the variation of the cell thickness is more than 0.3 μm but less than 0.5 μm is denoted by Δ, and the case where the absolute value of the variation of the cell thickness is not more than 0.3 μm is denoted by o.

As shown in Table 3, it is possible to keep the cell thickness even when the mean distribution volume of the conductive particles 20 is not more than 400 (piece)/mm². However, when the mean distribution volume of the conductive particles 20 is not less than 1200 (piece)/mm², it is not possible to keep the cell thickness even and non-uniform display occurs.

As described, considering to those three factors: leakage between wires; adhesion of the substrates; and cell thickness, it is desirable that the mean distribution volume of the conductive particles 20 is not more than 1000 (piece)/mm². More preferably, the mean distribution volume of the conductive particles 20 is not more than 600 (piece)/mm², and further preferably, it is not more than 400 (piece)/mm².

Also, assuming that the mean distribution volume of the conductive particles 20 is D (piece) /mm², and the area of the transfer section 24 is S mm², the transfer section 24 performs stable transfer when the mean distribution volume of the conductive particles 20 D is within a range of the following inequality (1).

$$D > 5/S \tag{1}$$

Namely, it is possible to maintain high reliability of the liquid crystal display device without decreasing liquid crystal retentivity in the vicinity of the sealing section 3 even under the conditions of high temperature and high humidity. Namely, taking into consideration of the result shown in Table 3, when the mean distribution volume of the conductive particles 20 D is within a range of the following inequality (2), $$1000 \geq D > 5/S \tag{2}$$

it is possible to prevent inadequate adhesion at the sealing section 3, uneven cell thickness, and an increase of occurrence of leakage between wires which is caused by aggregation of the conductive particles 20, and thereby prevent reliability of the liquid crystal display device from becoming poor, even under the conditions of high temperature and high humidity.

Therefore, it is possible to obtain a high-precise liquid crystal panel with desirable yield, and a narrow pitch. Further, it becomes possible to provide a liquid crystal display device at lower cost since active driving requires less volume of the conductive particles 20 than that of passive driving.

Figure 7:
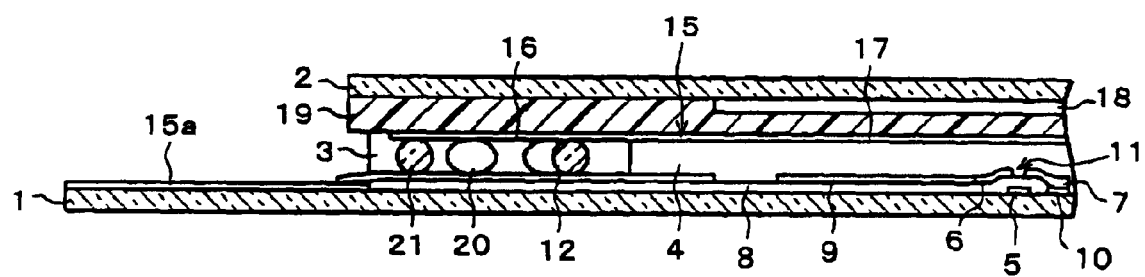
FIG. 7 is a cross-sectional view schematically showing a portion around the transfer section in the case where a lower contact pad and an upper contact pad are both made of ITO in the liquid crystal display device of FIGS. 1(*a*) through 1(*e*).
Figure 8:
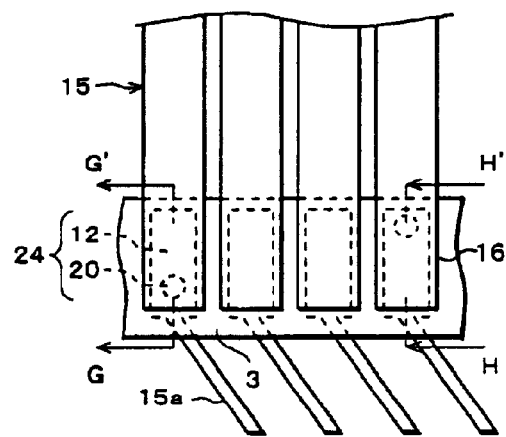
FIG. 8(*a*) is a drawing showing the transfer section in detail in the case where the lower contact pad and the upper contact pad are both made of ITO.
Figure 8:
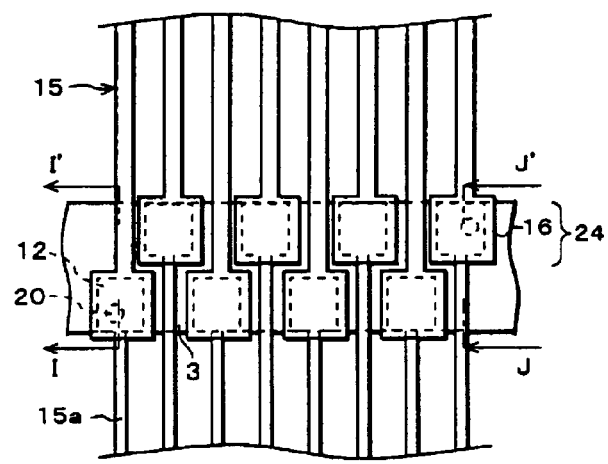
Figure 8:
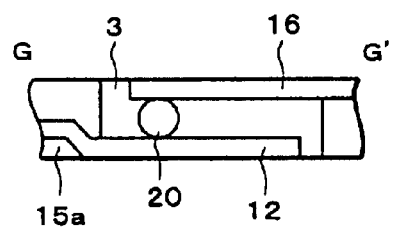
Figure 8:
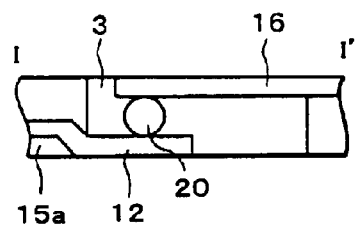
Figure 8:
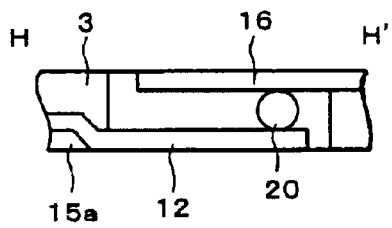
Figure 8:
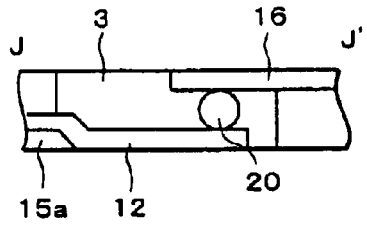
Figure 9:
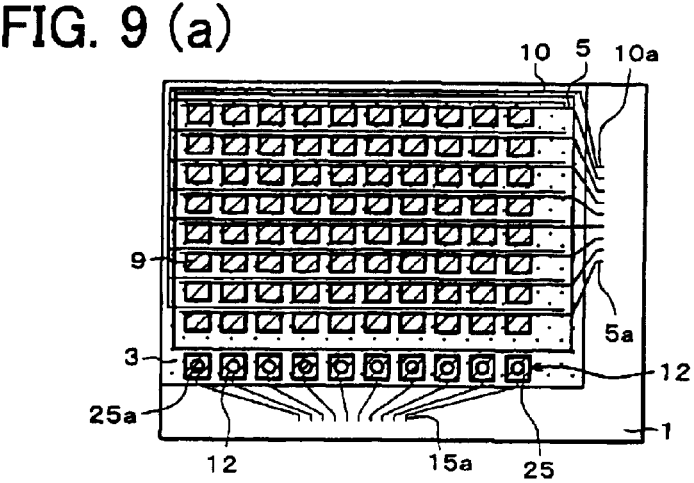
FIG. 9(*a*) is a plan view showing an arrangement of relevant part of the glass substrate used for the liquid crystal display device of FIGS. 1(*a*) through 1(*e*) in the case where an insulation film is formed in the sealing section.
Figure 9:
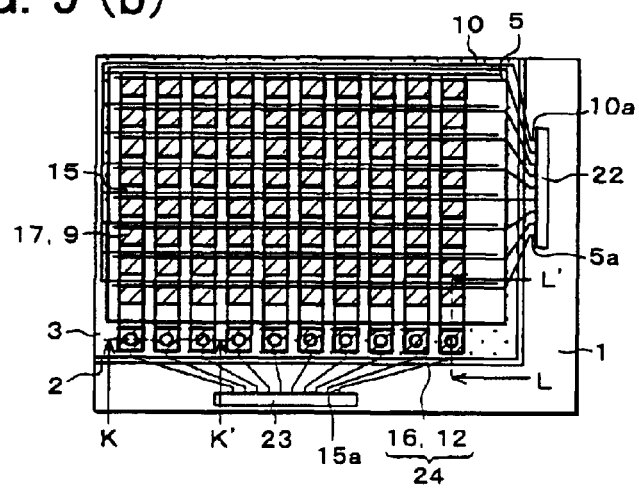
Figure 9:
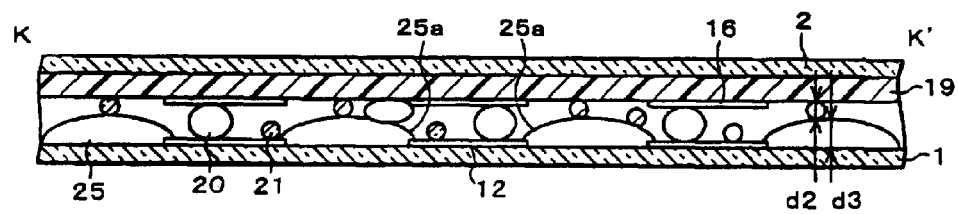
Figure 9:
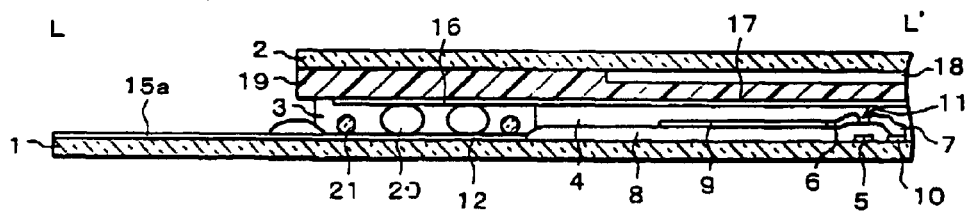
Figure 10:
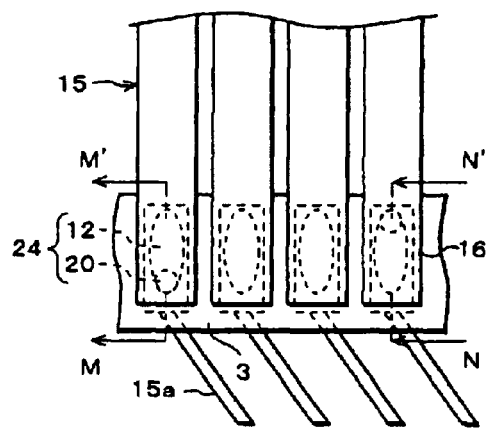
FIG. 10(*a*) is a drawing showing a transfer section of the liquid crystal display device of FIGS. 9(*a*) through 9(*d*) in detail.
Figure 10:
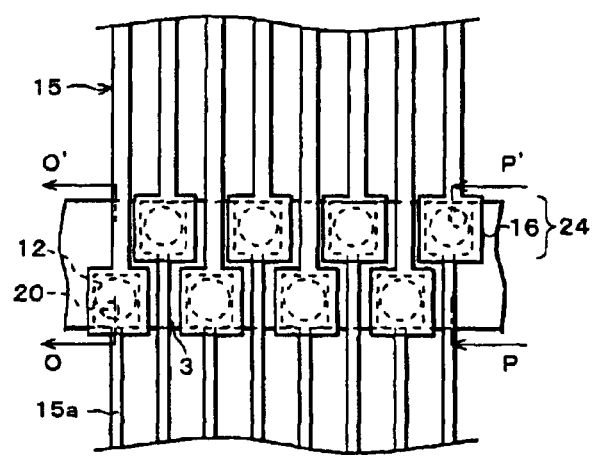
Figure 10:
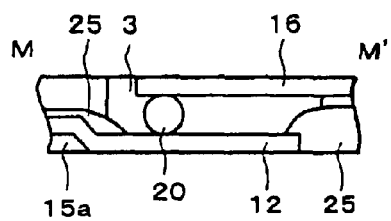
Figure 10:
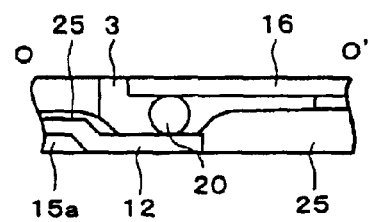
Figure 10:
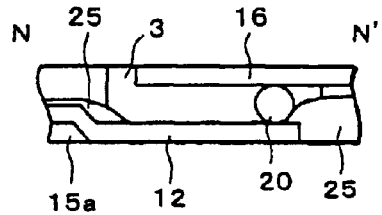
Figure 10:
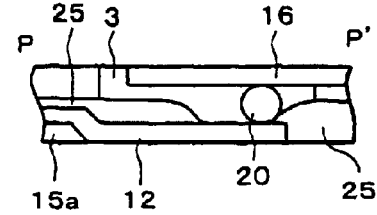

Note that, the lower contact pads 12 may be made of ITO as with the upper contact pads 16. The lower contact pads 12 and the upper contact pads 16 may be both made of Ta, or, may be made of ITO with different degrees of oxidation as long as the lower contact pads 12 have substantially the same resistance as that of the upper contact pads 16. For example, FIG. 7 shows the arrangement in which the lower contact pads 12 and the upper contact pads 16 are both made of ITO. Further, FIG. 8(a) shows the arrangement of the transfer section 24 in this case.

As shown in FIG. 7, the input terminals 15a made of Ta and the lower contact pads 12 made of ITO are electrically connected by partially overlapping each other. The upper contact pads 16 and the gradation signal lines 15, both made of ITO, are electrically connected to each other. The lower contact pads 12 and the upper contact pads 16 are electrically connected to each other via the conductive particles 20.

In order to manufacture the liquid crystal display device having the arrangement shown in FIG. 7, in the described manufacturing process of the liquid crystal display device shown in FIGS. 1(a) through 1(e), the patterning of the lower contact pads 12 should be performed when patterning the drain electrodes 6, the pixel electrodes 9 and the like after the silicon nitride film 8 has been deposited, instead of performing it when patterning the scanning lines 5. This provides the lower contact pads 12.

Since the conductive particles 20 are distributed at random in the sealing section 3, the upper contact pads 16 and the lower contact pads 12 are connected to each other via the conductive particles 20 either in the vicinity of the edge of the glass substrate 1 or at a portion distanced from the edge of the glass substrate 1. When the transfer section 24 has the arrangement shown in FIG. 2(a), the former case is shown in FIG. 2(b), and the latter case is shown in FIG. 2(c).

In the arrangement shown in FIG. 2(a), the gradation signal lines 15 and the upper contact pads 16 are made of ITO. On the other hand, the input terminals 15a of the gradation signal lines 15 and the lower contact pads 12 are lade of Ta, which has a smaller resistance than that of ITO. Therefore, $R_{D-D'}$, which is the resistance between D–D' (see FIG. 2(c)) is smaller than $R_{C-C'}$, which is the resistance between C–C' (see FIG. 2(b)), because the former includes more Ta. Namely, $R_{C-C'}>R_{D-D'}$. Thus, if adjacent transfer sections 24 have different distributions of the conductive particles 20, the effective value of the signal voltage becomes different due to a delay of the signal voltage of the gradation signal lines 15, this causes non-uniform display on each gradation signal line 15.

On the other hand, in the arrangement shown in FIG. 8(a), in other words, in the case where the lower contact pads 12 are made of ITO as with the upper contact pads 16, $R_{G-G'}$ which is the resistance between G–G' (see FIG. 8(b)), and $R_{H-H'}$, which is the resistance between H–H' (see FIG. 8(c)), are substantially the same.

This makes it possible to suppress the variation of contact resistance between the lower contact pads 12 and the upper contact pads 16 caused by a variation of distribution of the conductive particles 20 in the sealing section 3, thereby providing a liquid crystal display device of a desirable display quality which can suppress non-uniform display.

Note that, as shown in FIG. 2(d), in the case where the transfer section 24 has the staggered arrangement, $R_{F-F'}$, which is the resistance between F–F' (see FIG. 2(f)), is smaller than $R_{E-E'}$, which is the resistance between E–E' (see FIG. 2(e)), as with the case shown in FIG. 2(a), because the former includes more Ta. Namely, $R_{E-E'}>R_{F-F'}$. Thus, the conductive particles 20 are differently distributed in adjacent transfer sections 24, and non-uniform display occurs on each gradation signal line 15.

On the other hand, in the arrangement shown in FIG. 8(d), since the lower contact pads 12 are made of ITO as with the upper contact pads 16, $R_{I-I'}$, which is the resistance between I–I' (see FIG. 8(e)), and $R_{J-J'}$, which is the resistance between J–J' (see FIG. 8(f)), are substantially the same despite the variation of distribution of the conductive particles 20. Therefore, it is possible to suppress the variation of contact resistance between the lower contact pads 12 and the upper contact pads 16 in adjacent transfer sections 24.

Further, as shown in FIGS. 9(a) and 9(c), an insulation film 25 with an opening 25a (opening section) may be provided on the glass substrate 1 in the sealing section 3, and the lower contact pads 12 may be disposed in the opening 25a. FIG. 9(a) shows the same arrangement as that of FIG. 1(a) but includes the insulation films 25. The glass substrate 1 of FIG. 9(a) and the counter substrate 2 of FIG. 1(b) are combined together to have the arrangement of FIG. 9(b).

The insulation film 25 is provided by forming a silicon nitride film over the input terminals 5a, 10a, 15a beneath the sealing section 3, and then removing only a portion of the silicon nitride film which covers the lower contact pads 12, so as to form the opening 25a.

By the lower contact pad 12 which is exposed at the opening 25a, the upper contact pad 16 and the lower contact pad 12 are electrically connected to each other via the conductive particles 20 which are distributed in the opening 25a.

Consequently, as shown in FIGS. 9(c) and 9(d), the upper contact pads 16 and the lower contact pads 12 are electrically connected to each other only via the conductive particles 20 which are distributed in the opening 25a, thereby suppressing leakage between wires in adjacent transfer sections 24 even when the conductive particles 20 aggregate.

In the case where the insulation film 25 is not provided, in the area which is not required to be electrically connected via the conductive particles 20, it is necessary to provide a gap greater than the diameter of the conductive particles 20 (for example, 7 µm) between wires, so as to avoid leakage between wires such as the input terminals 15a, which are routing wiring section of the gradation signal lines 15.

However, by forming the insulation film 25 in the area which is not required to be electrically connected via the conductive particles 20, it becomes possible to reduce the gap between wires to the diameter of the conductive particles 20 or smaller. This makes it possible to also reduce the routing wiring section of the input terminals 15a, thereby realizing a liquid crystal display device having a smaller frame without inducing leakage between wires via the conductive particles 20.

Further, in the case where the insulation film 25 is formed, as shown in FIG. 9(c), the gap between the glass substrate 1 and the counter substrate 2 is determined by the thickness d3 of the insulation film 25 and the diameter d2 of the spacers 21. Further, the conductive particles 20 electrically connect the upper contact pad 16 and the lower contact pad 12 by being slightly deformed in the opening 25a of the insulation film 25.

Here, it is preferable that the diameter d1 of the conductive particles 20 is greater than the gap between the glass substrate 1 and the counter substrate 2 (the cell thickness), in other words, the sum of the thickness d3 of the insulation film 25 (the thickest portion of the film in the sealing section 3) and the diameter d2 of the spacers 21 (d1>d2+d3). According to this diameter d1, the two substrates 1 and 2 are combined by curing the sealing material while applying pressure to slightly deform the conductive particles 20. Thus, by deforming the conductive particles 20, it is possible to maintain the electrical connection even when the cell thickness: the gap between the glass substrate 1 and the counter substrate 2, varies or changes. This enables a stable electrical connection, and provides stability against the variations or changes of the cell thickness.

Figure 11:
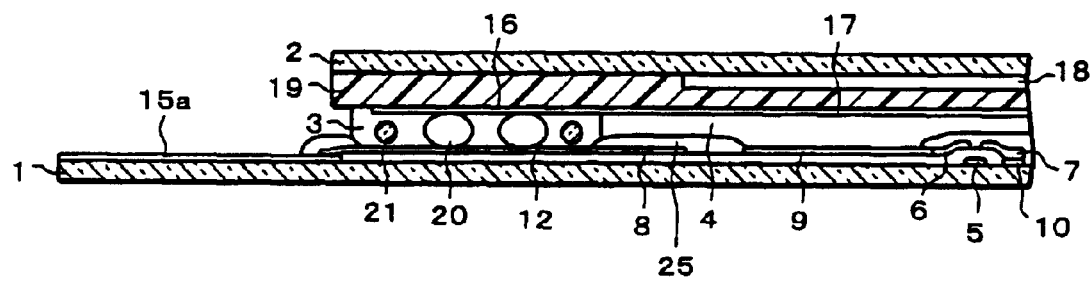
FIG. 11 is a cross-sectional view schematically showing a portion around the transfer section in the case where on insulation film is formed in the sealing section on the glass substrate and the lower contact pad and the upper contact pad are both made of ITO.
Figure 12:
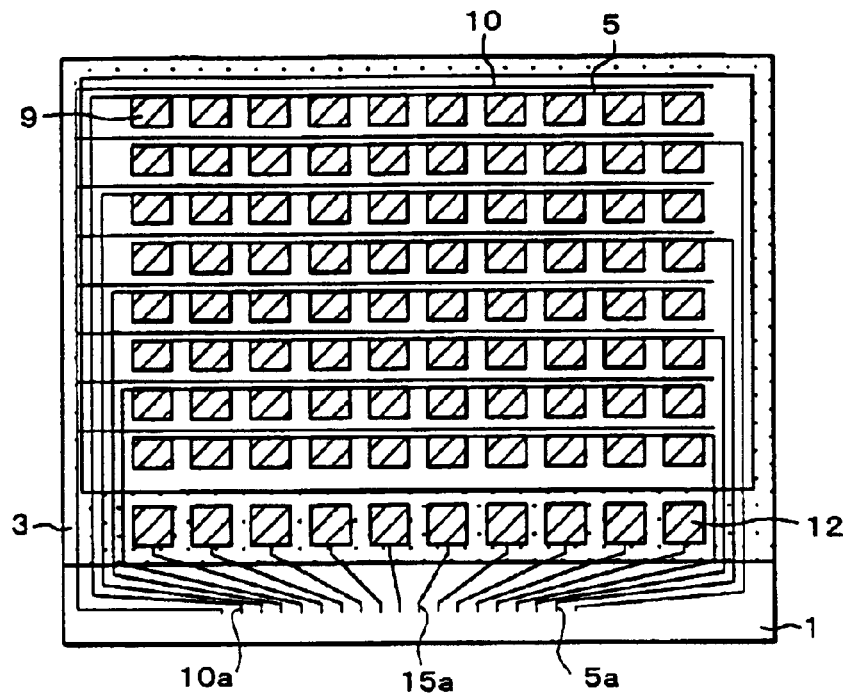
FIG. 12(a) is a plan view showing an arrangement of the glass substrate when a driving IC is provided as a single chip.
FIG. 12(b) is a plan view showing an arrangement of the liquid crystal display device when a driving IC is provided as a single chip.
Figure 12:
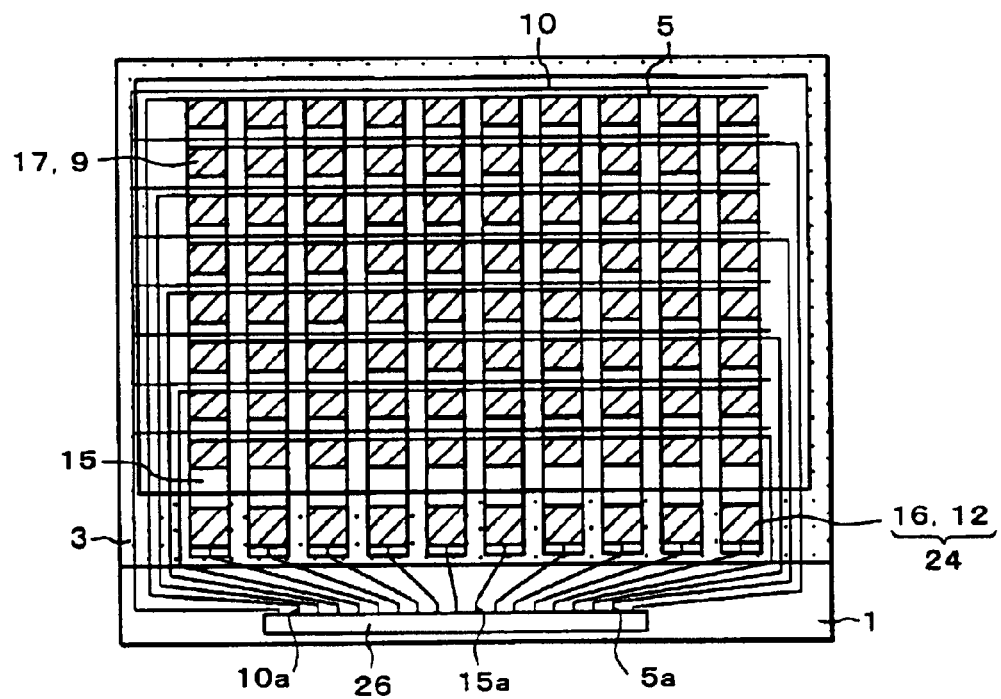

Note that, as shown in FIG. 11, in the arrangement having the insulation film 25, the lower contact pads 12 and the upper contact pads 16 may be both made of ITO as with the arrangement shown in FIG. 7. As shown in FIG. 11, the input terminals 15a of the gradation signal lines 15 made of Ta, and the lower contact pads 12 made of ITO are electrically connected to each other by partially overlapping each other. FIG. 10(a) shows the arrangement of the transfer section 24 in this case.

In the arrangement shown in FIG. 10(a), $R_{M-M'}$, which is the resistance between M–M' (see FIG. 10(b)), and $R_{N-N'}$, which is the resistance between N–N' (see FIG. 10(c)), are substantially the same as with the arrangement shown in FIG. 8(a).

This makes it possible to suppress the variation of contact resistance between the lower contact pads 12 and the upper contact pads 16 caused by a variation of distribution of the conductive particles 20 in the sealing section 3.

Further, as shown in FIG. 10(d), in the case where the transfer section 24 has the staggered arrangement, $R_{O-O'}$, which is the resistance between O–O' (see FIG. 10(e)) and $R_{P-P'}$, which is the resistance between P–P' (see FIG. 10(f)), are substantially the same as with the arrangement shown in FIG. 8(b). This makes it possible to prevent leakage between adjacent transfer sections 24, and also, makes it possible to increase the area of the transfer section 24, thereby reducing the contact resistance in the transfer section 24. As a result, the required area for the upper contact pad 16 or lower contact pad 12 can be reduced, and display failure due to blunting of the signal voltage can be prevented, thereby providing a high-precision liquid crystal display device.

Note that, the input terminals 5a, 10a and 15a are not necessarily required to be formed on the glass substrate 1 which bears the TFTs 11 as long as they all are formed on a single substrate. Alternatively, these input terminals may be formed on the counter substrate 2.

Further, the insulation film 25 having the opening 25a is not necessarily required to be formed on the glass substrate 1 as long as the upper contact pads 16 and the lower contact pads 12 are connected via the opening 25a. Alternatively, the insulation film 25 may be formed on the counter substrate 2 or on both of the glass substrate 1 and the counter substrate 2.

[Second Embodiment]

The following will explain another embodiment of the present invention with reference to FIGS. 13(a) through 13(e) and FIGS. 14(a) through 14(d). For ease of explanation, components having the equivalent functions to those shown in the drawings pertaining to the first embodiment will be given the same reference symbols, and explanation thereof will be omitted here.

Figure 13:
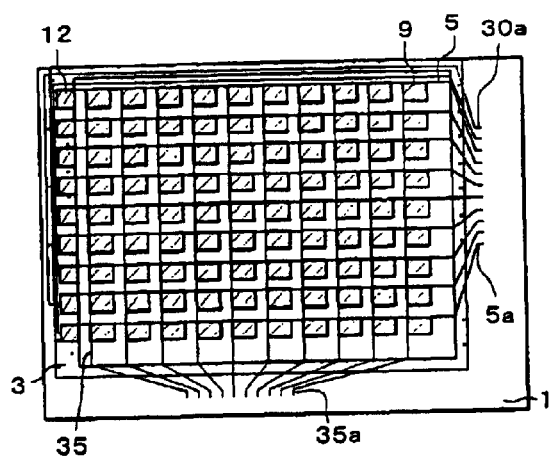
FIG. 13(a) is a plan view showing an arrangement of relevant part of a glass substrate used for a liquid crystal display device according to another embodiment of the present invention.
FIG. 13(b) is a plan view showing an arrangement of relevant part of a counter substrate used for the liquid crystal display device of FIG. 13(a).
FIG. 13(c) is a plan view showing an arrangement of relevant part of the liquid crystal display device of FIG. 13(a).
FIG. 13(d) is a cross-sectional view, taken along the line Q–Q' of FIG. 13(c).
FIG. 13(e) is a cross-sectional view, taken along the line R–R' of FIG. 13(c).
Figure 13:
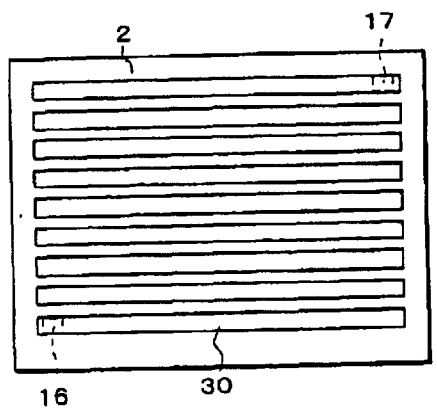
Figure 13:
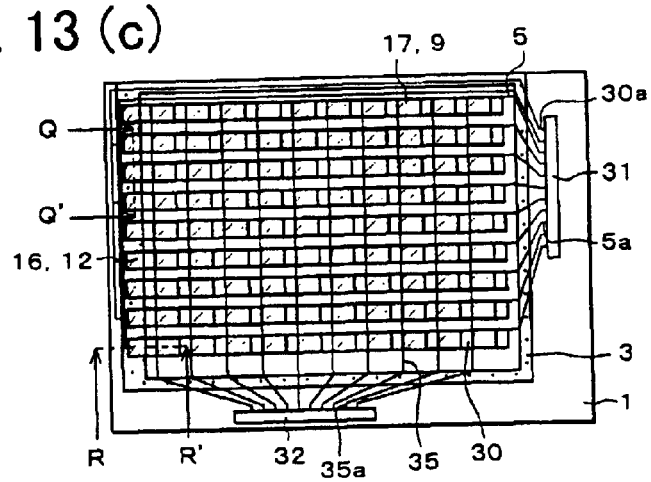
Figure 13:
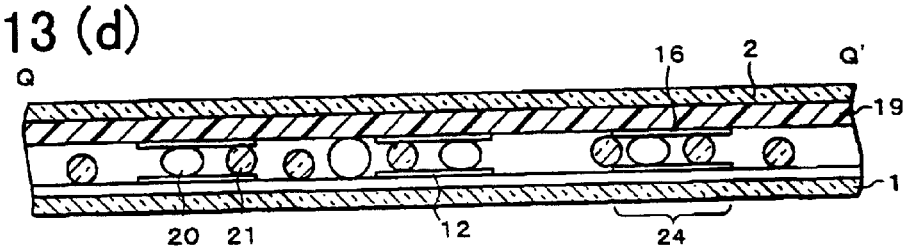
Figure 13:
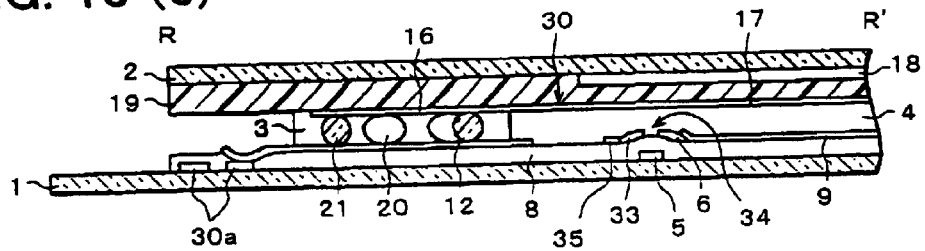
Figure 14:
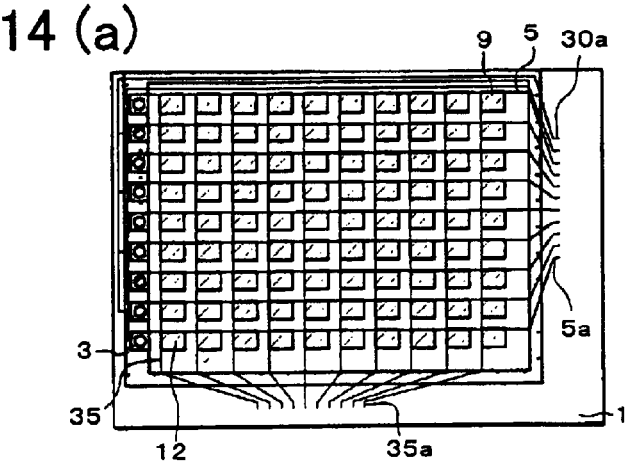
FIG. 14(a) is a plan view showing an arrangement of relevant part of the glass substrate used for the liquid crystal display device of FIGS. 13(a) through 13(e) in the case where an insulation film is formed in the sealing section.
FIG. 14(b) is a plan view showing an arrangement of relevant part of the liquid crystal display device in the case where the insulation film is formed.
FIG. 14(c) is a cross-sectional view, taken along the line S–S' of FIG. 14(b).
FIG. 14(d) is a cross-sectional view, taken along the line T–T' of FIG. 14(b).
Figure 14:
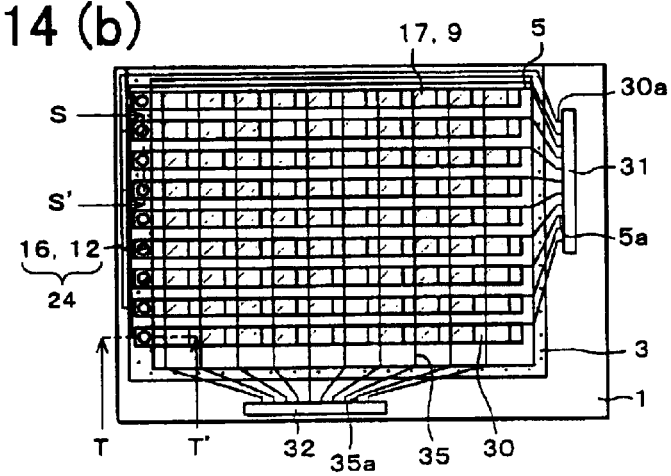
Figure 14:
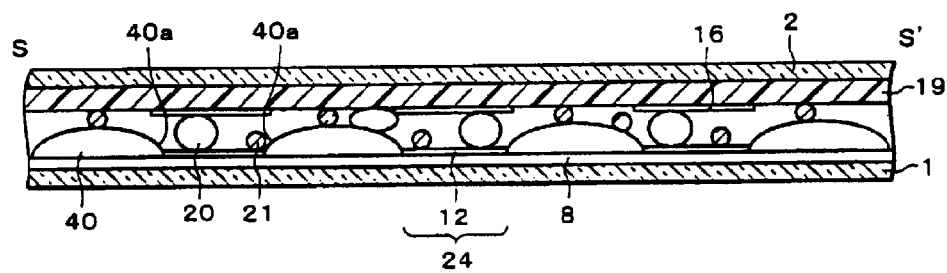
Figure 14:
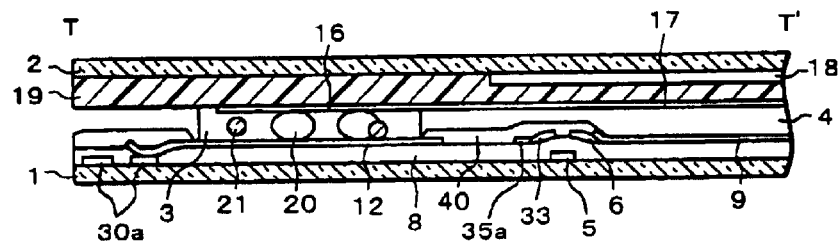

As shown in FIG. 13(e), as with the First embodiment, a liquid crystal display device according to the present embodiment has a glass substrate 1 made of glass and a counter substrate 2 which are opposed via a sealing section 3. And these two substrates are sealed with a liquid crystal layer 4 (medium layer).

Further, on the glass substrate 1 which is an active matrix substrate, a TFT 34, a pixel electrode 9, a gradation signal line 35, an input terminal 30a of a reference signal line 30 and a lower contact pad 12 are disposed. Note that, the TFT 34 includes a scanning line 5 (the first signal wiring), a drain electrode 6, a source electrode 33 and a silicon nitride film 8.

Pixel electrodes 9 are disposed in a matrix manner. And a TFT 34 which is a switching element having three terminals is provided on each pixel electrode 9.

In each of the TFTs 34, the drain electrode 6 is connected to the pixel electrode 9, and the source electrode 33 is connected to a same gradation signal line 35 in each of the TFTs 34 which are horizontally (in a column direction) aligned in a display screen.

The silicon nitride film 8 which is formed on substantially the entire surface of the glass substrate 1 while covering the scanning lines 5 is a gate insulation film. The lower contact pads 12 and the pixel electrode 9 are made of transparent conductive film such as ITO (Indium Tin Oxide).

As shown in FIG. 13(c), the scanning lines 5 are disposed in parallel with reference signal lines 30 (the second signal wiring, described later), and an input terminal 5a of the scanning line 5 and an input terminal 30a of the reference signal line 30 are connected to a driving IC 31.

The gradation signal lines 35 are data lines to which a data signal is provided, and are orthogonally disposed to the scanning lines 5 on the glass substrate 1 as shown in FIG. 13(a). The input terminal 35a of the gradation signal line 35 is connected to a driving IC 32.

Further, the lower contact pads 12 are connected to the input terminals 30a of the reference signal lines 30 (described later) which are connected to the driving IC 31. Here, the input terminals 30a of the reference signal lines 30 also act as routing wiring of the reference signal lines 30.

The scanning line 5, the input terminal 5a, the source electrode 33, the drain electrode 6, the input terminal 30a, the gradation signal line 35 and the input terminal 35a are formed by metal such as Ta, respectively.

Meanwhile, as shown in FIG. 13(e), an overcoat film 19 is formed on the counter substrate 2 so as to cover a color filter 18. Further, the reference signal lines 30, upper contact pads 16 and a counter electrode 17 are provided on the overcoat film 19.

The reference signal lines 30 are signal wiring which applies voltage to the liquid crystal layer 4, and are disposed in parallel with the scanning lines 5 on the glass substrate 1. In this arrangement, as shown in FIG. 13(b) and 13(e), each reference signal line 30 also act as the counter electrode 17 at the portion opposite to the pixel electrode 9, and also, act as the upper contact pads 16 at the portion opposite to the lower contact pads 12. Namely, the counter electrode 17 and the upper contact pads 16 are connected to the reference signal lines 30. The reference signal lines 30 is made of transparent conductive film such as ITO.

As shown in FIG. 13(d), the upper contact pads 16 is connected to the lower contact pads 12 via the conductive particles 20. Namely, the reference signal line 30 transfers to the glass substrate 1 via the transfer section 24.

The following will explain a driving principle of liquid crystal.

The liquid crystal display device sequentially scans time-shared display data along the scanning lines 5 to display a screen.

For example, when a scanning line 5 is horizontally scanned, a gate voltage for turning on the TFT 34 is applied to the scanning lines 5. Meanwhile, a gate voltage for turning off the TFT 34 is applied to the other scanning line 5. Thus, when the scanning line 5 is horizontally scanned, only the TFT 34 belonging to the scanned scanning line 5 turns on, and a signal voltage which was applied to the gradation signal line 35 passes from the source electrode 33 to the drain electrode 6, and then, is applied to the pixel electrode 9 of the scanning line 5. With these processes, the liquid crystal on each pixel electrode 9 is driven by the potential difference between the pixel voltage applied to the pixel electrode 9, and a counter voltage applied to the counter electrode 17.

As described, by sequentially scanning the scanning line 5 and applying the signal voltage in accordance with driving condition of each pixel to all of the gradation signal lines 35, it is possible to display all of the required pixel.

The following will explain an example of the manufacturing processes of the glass substrate 1 used for the liquid crystal display device, shown in FIGS. 13(a) through 13(e) according to the present embodiment. Note that, the manufacturing processes of the counter substrate 2 and the mounting process refer to that of the First Embodiment.

Firstly, a metal film made of Ta or the like is deposited on a glass substrate 1 by a sputtering method. And then, a scanning line 5, an input terminal 5a of the scanning line 5, an input terminal 30a of the reference signal line, an input terminal 35a of the gradation signal line 35 are formed by patterning the metal film into desired shape using a photo-lithography method. The input terminals 5a, 30a and 35a respectively include routing wiring sections, and connecting sections of driving circuits such as the driving ICs 31 and 32. And the connecting sections for driving circuits include electrodes (not shown) for receiving an external signal voltage. Here, the arrangement of the input terminals adopted in the present embodiment is for a liquid crystal display element having the COG structure; however, the input terminals 5a, 30a and 35a may have electrodes for being connected to a TAB so that a liquid crystal display element equipped with the TAB can be realized.

Next, a silicon nitride film 8 is deposited on substantially the entire of the glass substrate 1 so as to cover the scanning lines 5 by the plasma CVD (Chemical Vapor Deposition). Thereafter, the patterning is carried out by the photo-lithography method such that the silicon nitride film 8 which is formed on the area where the input terminals 5a, the input terminals 30a and the input terminals 35a will be formed. Next, an intrinsic semiconductor layer and an active semiconductor layer are continuously deposited using plasma CVD. And then, the intrinsic semiconductor layer and the active semiconductor layer are patterned into land shapes. During the patterning, the part (channel section) of the active semiconductor layer which is formed between the source electrode 33 and the drain electrode 6 is removed.

Next, after preparing a metal film made of Ta is deposited by the sputtering method, the source electrode 33, the drain electrode 6 and the gradation signal line 35 are formed by patterning the metal film into a desirable form using the photo-lithography method. And, after depositing an ITO film which is a transparent conductive film by a sputtering method, the pixel electrodes 9 and the lower contact pads 12 are formed by patterning the ITO film using the photo-lithography method. Here, the drain electrode 6 and the pixel electrode 9 are electrically connected.

Next, the silicon nitride film is formed on substantially the entire surface of the glass substrate 1 by the plasma CVD, and then is patterned by the photo-lithography method so as to remove the area where the input terminals 5a, the input terminals 30a, the input terminals 35a will be formed and to form a protection film (not shown).

Further, an alignment film (not shown) is formed by the printing, and is aligned by rubbing.

Meanwhile, on the counter substrate 2, after depositing an ITO film which is a transparent conductive film by the sputtering method, the counter electrode 17, the reference signal line 30 and the upper contact pads 16 are formed by patterning the ITO film into desirable form using a photo-lithography method. Here, the counter electrode 17, the reference signal line 30 and the upper contact pads 16 are formed into a continuous pattern to be electrically conductive each other. Note that, a substrate having a color filter layer 18 and an overcoat film 19 is used as the counter substrate 2.

Further, after forming an alignment film (not shown) by printing, the alignment film is aligned by rubbing.

The process of combining the glass substrate 1 and the counter substrate 2, and the rest of the processing are the same as those of the first embodiment.

Note that, as shown in FIGS. 14(a) through 14(d), an insulation film 40 may be formed on the silicon nitride film 8 so that the lower contact pads 12 expose. The insulation film 40 has an opening 40a to expose the lower contact pads 12. The insulation film is made of silicon nitride for example.

Therefore, it is possible to electrically connect the lower contact pads 12 and the upper contact pads 16 only via the conductive particles 20 which are distributed in the opening 40a as with the liquid crystal display device shown in FIGS. 9(a) through 9(d). By thus forming the insulation film 40 on the area not required to be electrically connected via the conductive particles 20, it is possible to reduce the gap between the wires smaller than the diameter of the conductive particles 20. This also makes it possible to reduce the routing wiring section in the input terminals 30a, thereby realizing a liquid crystal display device having a smaller frame without inducing leakage between the wires via the conductive particles 20. Further, it is possible to suppress leakage between wires in the adjacent transfer sections 24 even when the conductive particles 20 aggregate.

[Third Embodiment]

The following will explain the third embodiment of the present invention with reference to FIGS. 15(a) through 15(e) and FIG. 16. For ease of explanation, components having the equivalent functions to those shown in the drawings pertaining to the first embodiment will be given the same reference symbols, and explanation thereof will be omitted here.

Figure 15:
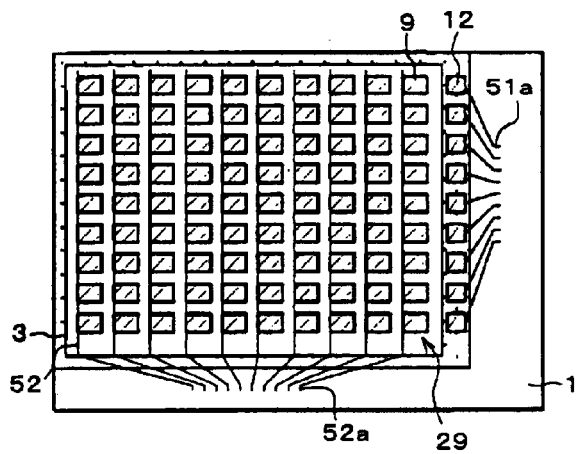
FIG. 15(a) is a plan view showing an arrangement of relevant part of a glass substrate used for the liquid crystal display device according to yet another embodiment of the present invention.
FIG. 15(b) is a plan view showing an arrangement of relevant part of a counter substrate used for the liquid crystal display device of FIG. 15(a).
FIG. 15(c) is a plan view showing an arrangement of relevant part of the liquid crystal display device of FIG. 15(a).
FIG. 15(d) is a cross-sectional view, taken along the line U–U' of FIG. 15(c).
FIG. 15(e) is a cross-sectional view, taken along the line V–V' of FIG. 15(c).
Figure 15:
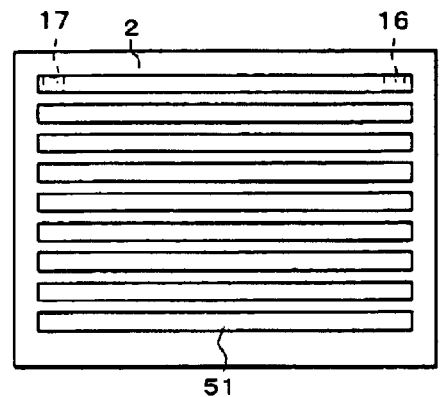
Figure 15:
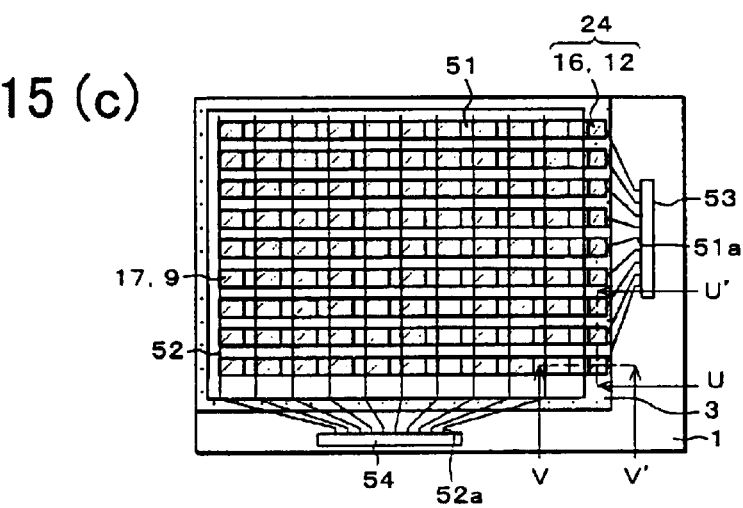
Figure 15:
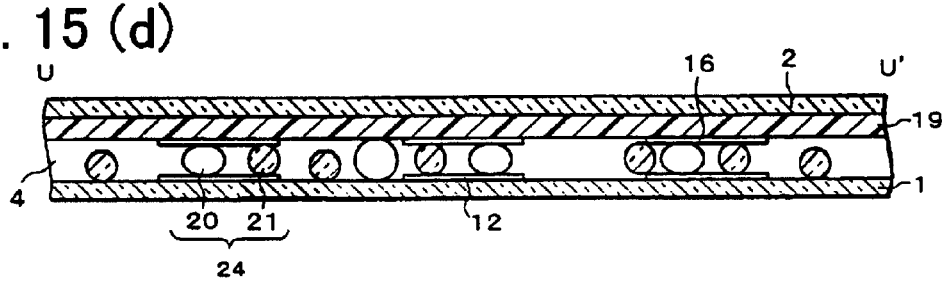
Figure 15:
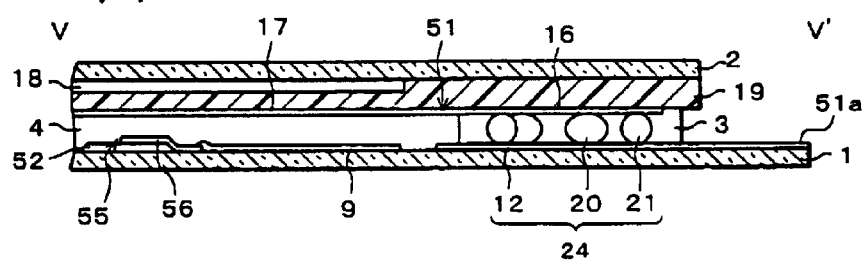

A liquid crystal display device shown in FIGS. 15(a) through 15(e) has an arrangement using MIM (metal insulator metal) 55 which is an element having two terminals, as a switching element. As shown in FIG. 15(e), the liquid crystal display device according to the present embodiment includes the MIM (switching element) 55 having a segment line 52 (first signal wiring) and a counter electrode metal 56, a pixel electrode 9, a common line 51 and a lower contact pad 12 (a first contact pads) which are provided on a glass substrate 1.

The MIM 55 is controlled so as to turns on/off in accordance with the potential difference between the segment line 52 as a scanning line, and the common line 51 as a signal line. When the MIM 55 is on, potential of not less than a subthreshold value is applied to the MIM 55 so that the resistance of the MIM 55 is reduced and charges are injected into the liquid crystal layer 4. Thus, the liquid crystal layer is driven.

As shown in FIG. 15(a), the lower contact pads 12 is connected to an input terminal 51a of the common line 51 (described later) which is connected to a driving IC 53 (see FIG. 15(c)).

Further, the segment line 52, an input terminal 52a of the segment line 52, the input terminal 51a of the common line 51 and the lower contact pads 12 are made of Ta, and the pixel electrode 9 is made of ITO.

Meanwhile, as shown in FIG. 15(e), an overcoat film 19 is formed on the counter substrate 2 so as to cover a color filter layer 18. The common line 51 (the second signal wiring), the upper contact pads 16 (the second contact pads) and the counter electrode 17 are provided on the overcoat film 19.

The common lines 51 are orthogonally disposed to the segment lines 52 on the glass substrate 1. In this arrangement, as shown in FIG. 15(b), each common line 51 also acts as the counter electrode 17 at the portion opposite to the pixel electrode 9, and also, acts as the upper contact pad 16 at the portion opposite to the lower contact pad 12.

The common lines 51 and the upper contact pads 16 are made of a transparent conductive film such as ITO. Here, the input terminals 51a also act as routing wiring of the common lines 51.

Further, as shown in FIG. 15(a), a sealing section 3 for sealing the liquid crystal of the liquid crystal layer 4 is provided while enclosing the display area 29 which is placed between the glass substrate 1 and the counter substrate 2. The sealing section 3 is made of a sealing material of ultraviolet setting resin as with the first embodiment, and has spacers 21 and conductive particles 20. Further, as shown in FIG. 15(d), a transfer section 24 is formed in an overlapping area of the conductive particles 20, the lower contact pads 12 and the upper contact pads 16.

As described, since the input terminals 51a and 52a are both formed on the glass substrate 1, it is possible to mount the TAB etc. to a liquid crystal panel without turning over the liquid crystal display element. This increases the efficiency of the mounting, thereby reducing manufacturing cost.

Further, since the input terminal 51a which also act as the routing wiring of the common line 51 is made of a material of smaller resistance (for example, Ta) than that of the material of the common line 51 (for example, ITO), it is possible to narrow a line width of the input terminal 51a, i.e., a wiring pitch and create a COG structure with a small pitch. Further, it is also possible to reduce the frame area (non-display area) of a liquid crystal display element.

Further, it is possible to form the input terminals 51a on the glass substrate 1 made of glass (on a surface of the glass, or on an inorganic film deposited on the substrate 1) instead of forming the input terminal 51a on the overcoat film 19 made of resin and formed on the counter substrate 2. This improves the mechanical strength and the adhesion between the input terminals 51a and the glass substrate 1, and also protects the terminal part from breakage when handling. Also, this makes re-work of mounting easier in case of mounting of the TAB, etc. is failed, thereby improving the yield.

The following will explain an example of the manufacturing steps of the glass substrate 1 used for the liquid crystal display device according to the present embodiment. Note that, the manufacturing processes of the counter substrate 2 refers to those of the First Embodiment.

Firstly, a metal film of Ta or the like is deposited on a glass substrate 1 by the sputtering method. And then, the segment line 52, an input terminal 52a of the segment line 52, an input terminal 51a of the common line 51, and the lower contact pads 12 are formed by patterning into a desirable form using photo-lithography. At this point, the input terminals 51a and 52a respectively include routing wiring sections, and connecting sections of driving circuits. And the connecting sections for driving circuits includes electrodes (not shown) for receiving an external signal voltage. Here, the arrangement of the input terminals adopted in the present embodiment is for a liquid crystal display element of the COG structure; however, the input terminals 51a and 52a may have electrodes for being connected to a TAB so that a liquid crystal display element equipped with the TAB can be realized.

Next, an oxide film of $Ta_2O_5$ is formed as an active layer using an anodic oxidization method. And then, the oxide film of $Ta_2O_5$ on the input terminals 51a and 52a is removed by a photo-lithography method or an etching method.

Then, Cr film is deposited by the sputtering method, and the counter electrode metal 56 of MIM 55 is formed into land shapes by the photo-lithography method.

And thereafter, an ITO film is formed by the sputtering method, and the pixel electrode 9 is formed by a photo-lithography method. Note that, the pixel electrode 9 is electrically connected to the counter electrode metal 56.

Further, an alignment film (not shown) is formed by printing, and is aligned by rubbing.

Figure 16:
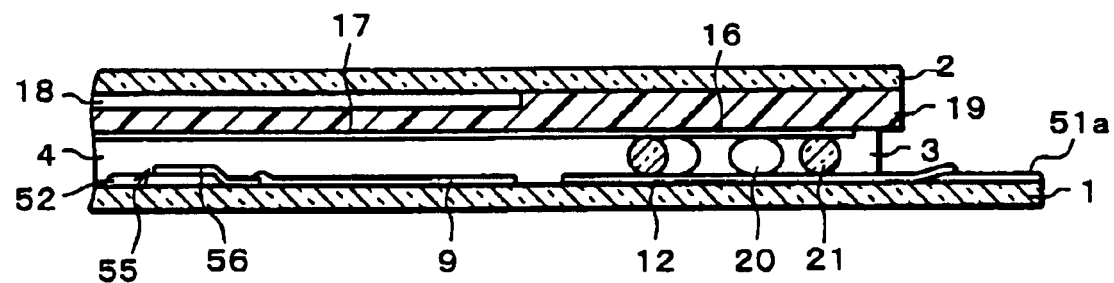
FIG. 16 is a cross-sectional view schematically showing a portion around the transfer section in the case where the lower contact pad and the upper contact pad are both made of ITO in the liquid crystal display device of FIGS. 15(a) through 15(e).

Note that, as shown in FIG. 16, the lower contact pads 12 and the upper contact pads 16 can be both made of ITO. At this point, the input terminals 51a made of Ta, and the lower contact pads 12 made of ITO are electrically connected by partially overlapping each other.

This makes it possible to suppress the variation of contact resistance between the lower contact pads 12 and the upper contact pads 16, the variation being caused by the variation of the conductive particles 20 in the sealing section 3, thereby suppressing non-uniform display. This ensures to provide a liquid crystal display of desirable display quality.

As described, the liquid crystal display devices in those embodiments include a substrate having switching element and a counter substrate which are opposed and sealed with liquid crystal of a liquid crystal layer. The first signal wiring for controlling the switching element is provided on one of these substrates, and the second signal wiring which is opposite to the first signal wiring and applies voltage to the liquid crystal layer is provided on the other substrate. In the liquid crystal display device having a sealing section for sealing liquid crystal of a liquid crystal layer while enclosing the display area between two substrates, the sealing section may have conductive particles in its transfer section to electrically connect the first signal wiring or the second signal wiring, to the substrate opposite to the first signal wiring or the second signal wiring.

With this arrangement, in a liquid crystal display device of active driving, the first signal wiring or the second signal wiring is electrically connected to the substrate opposite to the first signal wiring or the second signal wiring via the conductive particle. Namely, the first signal wiring is electrically connected to the substrate opposite to the first signal wiring, or the second signal wiring is electrically connected to the substrate opposite to the second signal wiring. Generally, active driving has wider permitted limit for the variation of contact resistance than that of passive driving. Thus, it requires less volume of the conductive particle, thereby making it possible to provide a liquid crystal display device of lower-cost.

In the foregoing liquid crystal display, it is preferable that an input terminal of the first signal wiring and an input terminal of the second signal wiring are provided on one of those substrates (the substrate having the switching element and the counter substrate).

With the arrangement, it is possible to mount a driving IC which is connected to the input terminals of the first signal wiring, and a driving IC which is connected to the input terminals of the second signal wiring on a single substrate. Therefore, it is not necessary to turn over the liquid crystal display element during the mounting process of a TAB on a liquid crystal panel. This increases the efficiency of mounting, thereby reducing manufacturing cost. Further, the driving IC can be provided as a single chip. Accordingly, the mounting can be more compact in size, and the cost of the element required for the driving IC and manufacturing cost can be reduced.

In the foregoing liquid crystal display device, it is preferable that the transfer section is provided on a first substrate which is one of those substrates bearing the input terminal of the first signal wiring and the input terminal of the second signal wiring. The transfer section is made up of the first contact pads connected to either of the first signal wiring or the second signal wiring which are provided on the first substrate, and the second contact pads connected to either of the first signal wiring or the second signal wiring which are provided on the second substrate, and the conductive particles connected to the first contact pads and the second contact pads.

With the foregoing arrangement, it is possible to electrically connect the first signal wiring and the substrate opposite to the first signal wiring, or the second signal wiring and the substrate opposite to the second signal wiring via the conductive particle, the first contact pads, and the second contact pads. Therefore, it is not necessary to turn over the liquid crystal display element during the mounting process of a TAB on a liquid crystal panel. This increases the efficiency of mounting, thereby reducing manufacturing cost.

In the foregoing liquid crystal display device, it is preferable that resistance of the first contact pads and the second contact pads are substantially the same.

With the foregoing arrangement, it is possible to suppress the variation of contact resistance between the first contact pads and the second contact pads caused by variation of distribution of the conductive particles in the sealing section. This suppresses occurrence of non-uniform display, thereby providing a liquid crystal display of desirable display quality.

In the foregoing liquid crystal display device, it is preferable that the transfer section is provided between the first signal wiring and the first signal generation circuit which provides signal to the first signal wiring, or between the second signal wiring and the second signal generation circuit which provides signal to the second signal wiring.

With the foregoing arrangement, it is possible to downsize the routing wiring section of the first signal wiring or the second signal wiring, thereby reducing the frame area (non-display area) in the liquid crystal display device. Thus, it is possible to realize a liquid crystal display device with a smaller frame.

In the foregoing liquid crystal display device, when assuming that the mean distribution volume of the conductive particles is D (piece) $/mm^2$, and the area of the transfer section horizontal to the substrates is S $mm^2$, it is preferable that the mean distribution volume of the conductive particles 20 should satisfies $1000 \geq D > 5/S$. To be more desirable, the mean distribution volume of the conductive particles 20 satisfies $600 \geq D > 5/S$. To be further desirable, it satisfies $400 \geq D > 5/S$.

With the foregoing arrangement, it is possible to prevent an increase of leakage between the wires due to a decrease of adhesion of the sealing section, uneven thickness of the cell, and aggregation of the conductive particles, thereby preventing reliability of the liquid crystal display device from becoming poor, even under the conditions of high temperature and high humidity. Accordingly, it is possible to produce a liquid crystal panel with desirable yield, high precision and a small pitch, thereby providing a liquid crystal display device with high reliability.

In the foregoing liquid crystal display device, it is preferable that the first substrate is the substrate having the switching element.

With the foregoing arrangement, the input terminal of the first signal wiring and the input terminal of the second signal wiring are provided on the substrate having the switching element. This makes it possible to form the input terminal of the first signal wiring and the input terminal of the second signal wiring on a glass (the material of the substrate having the switching elements) or an inorganic film formed on the substrate having the switching elements without extra manufacturing steps. Therefore, the strength can be improved since the input terminal of the first signal wiring and the input terminal of the second signal wiring have desirable adhesion.

Further, the substrate having the switching elements necessarily has metal wiring of small resistance. Meanwhile, wiring made by a single-layer transparent conductive film of ITO or the like is formed on the counter substrate which also acts as pixel electrode. Generally, the transparent conductive film of ITO or the like has greater resistance than metal wiring of Ta or Al or the like since transmittance is its important factor. Thus, a wider wiring pitch is required when routing wiring.

However, providing the input terminal of the first signal wiring and the input terminal of the second signal wiring on the substrate having the switching element realizes routing wiring of low resistance, thereby narrowing the frame and making the mounting compact in size.

In the foregoing liquid crystal display device, it is preferable that the input terminal of the first signal wiring and the input terminal of the second signal wiring are made of a conductive material of smaller resistance than that of the first signal wiring and the second signal wiring formed on the second substrate.

With the foregoing structure, it is possible to narrow the width of the input terminal of the first signal wiring and the input terminal of the second signal wiring, in other words, narrow the wiring pitch, thereby ensuring to create a COG structure with a small pitch. Further, this ensures a liquid crystal display device with a smaller frame, thereby making the mounting compact in size, and reducing the mounting area.

In the foregoing liquid crystal display device, it is preferable that an insulation film having an opening is formed on at least one of the substrates, and the first contact pads or the second contact pads is provided in the opening.

In the case where the insulation film is not formed, in the area which is not required to be electrically connected via the conductive particles, it is necessary to conserve the gap between the wires (i.e., the gap between the adjacent transfer sections) greater than the diameter of the conductive particles so as to avoid leakage between the wires.

However, with the foregoing arrangement, it is possible to electrically connect the first contact pads and the second contact pads only via the conductive particles which are distributed in the opening. By thus forming the insulation film in the area which is not required to be electrically connected via the conductive particles, it becomes possible to reduce the gap between the wires smaller than the diameter of the conductive particles. This makes it possible to also reduce the routing wiring section in the input terminal, thereby realizing a liquid crystal display device having a smaller frame without inducing leakage between the wires via the conductive particle. Further, it also becomes possible to suppress leakage between the wires in the adjacent transfer sections even when the conductive particles are agglutinated.

In the foregoing liquid crystal display device, it is preferable that the conductive particles is elastic.

With the foregoing structure, when two opposed substrates are bonded and fixed, the conductive particles having elasticity is deformed to some extent between the substrates. This makes it possible to conserve a plenty of contact area for the first contact pads and the second contact pads, thereby ensuring desirable electrical conductivity. Consequently, it is possible to reduce the contact resistance between the first contact pads and the second contact pads, thereby suppressing blunting of signal which is sent to the second signal wiring.

In the foregoing liquid crystal display device, it is preferable that the conductive particles has a round shape and its diameter is greater than the cell thickness of the sealing section.

With the structure, the conductive particles electrically connect the first contact pads and the second contact pads when the conductive particles are slightly deformed. Therefore, it is possible to maintain the electrical connection even when the cell thickness: the gap between the substrates varies or changes. This realizes a stable electrical connection, and provides stability against the variations or changes of the cell thickness.

In the foregoing liquid crystal display device, it is preferable that the conductive particles are provided only in the area at or 50 $\mu$m from the interface between the liquid crystal layer and the sealing section.

Commonly, in comparison with STN-LCD, a voltage-hold type liquid crystal display element which is used for an active matrix liquid crystal display device shows great degradation of image quality caused by degradation with time of the voltage-hold capability for liquid crystal. The degradation with time of the voltage-hold capability for liquid crystal is caused by elution of the impurity from the sealing material, ionization of ion, or other reason.

However, with the foregoing arrangement, it is possible to prevent the decrease of voltage-hold capability for liquid crystal and the non-uniform display occurred near the sealing section which are caused by elution of the impurity from the sealing material, or ionization of ion. Therefore, the degradation with time of voltage-hold capability for liquid crystal is prevented, thereby making it possible to provide a liquid crystal display with stable reliability.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A liquid crystal display device, comprising:
   a switching element substrate comprising a plurality of switching elements;
   a counter substrate opposite to the switching element substrate;
   a liquid crystal layer formed between the substrates;
   a sealing section provided so as to enclose a display area between the substrates for sealing liquid crystal of the liquid crystal layer;
   a first signal wiring, provided on one of the substrates for controlling the switching elements;
   a second signal wiring, provided on the other substrate so as to be opposite to the first signal wiring for applying a voltage to the liquid crystal layer;
   at least one transfer section for electrically connecting the first signal wiring or the second signal wiring and the substrate opposite to the first signal wiring or the second signal wiring, wherein said transfer section comprises both first and second types of particles, said first type of particles in said transfer section being conductive and having greater flexibility and greater size than said second type of particles in said transfer section, so that said first type of particles in said transfer section is for electrically connecting the first signal wiring or the second signal wiring and the substrate opposite to the first signal wiring or the second signal wiring, and said second type of particles is for spacing the substrates from one another;
   wherein the transfer section includes (a) a first contact pad, provided on a first substrate which is one of the substrates and has an input terminal of the first signal wiring and an input terminal of the second signal wiring, which is connected to one of the first signal wiring and the second signal wiring provided on the first substrate, (b) a second contact pad, provided on a second substrate which is the other substrate, which is connected to the other one of the first signal wiring and the second signal wiring on the second substrate (the other substrate), and (c) the conductive particles connected to the first contact pad and the second contact pad; and
   wherein the transfer sections are provided alternately along both edges of a width in the sealing section, and a width of the second signal wiring is narrower than that of the second contact pad.

2. The liquid crystal display device set forth in claim 1, wherein: an input terminal of the first signal wiring and an input terminal of the second signal wiring are provided on one of the substrates.

3. The liquid crystal display device set forth in claim 2, wherein: the transfer section includes (a) a first contact pad, provided on a first substrate which is one of the substrates and has the input terminal of the first signal wiring and the input terminal of the second signal wiring, which is connected to one of the first signal wiring and the second signal wiring provided on the first substrate, (b) a second contact pad, provided on a second substrate which is the other substrate, which is connected to the other one of the first signal wiring and the second signal wiring on the second substrate (the other substrate), and (c) the conductive particles connected to the first contact pad and the second contact pad.

4. The liquid crystal display device set forth in claim 3, wherein: the first and second contact pads have substantially a same resistance.

5. The liquid crystal display device set forth in claim 4, wherein: the transfer section is provided (a) between the first signal wiring and a first signal generation circuit which provides a signal to the first signal wiring, or (b) between the second signal wiring and a second signal generation circuit which provides a signal to the second signal wiring.

6. The liquid crystal display device set forth in claim 3, wherein: the transfer section is provided (a) between the first signal wiring and a first signal generation circuit which provides a signal to the first signal wiring, or (b) between the second signal wiring and a second signal generation circuit which provides a signal to the second signal wiring.

7. The liquid crystal display device set forth in claim 3, wherein: the first substrate is the switching element substrate having the switching elements.

8. The liquid crystal display device set forth in claim 3, wherein: the input terminal of the first signal wiring and the input terminals of the second signal wiring are made of a conductive material whose resistance is smaller than that of the first signal wiring or the second signal wiring formed on the second substrate.

9. The liquid crystal display device set forth in claim 3, wherein: an insulation film having an opening is formed on at least one of the substrates, and the first contact pad or the second contact pad is provided in the opening.

10. The liquid crystal display device set forth in claim 1, wherein: the conductive particles have elasticity.

11. The liquid crystal display device set forth in claim 10, wherein: the conductive particles have round shapes and diameters which are greater than a cell thickness of the sealing section.

12. The liquid crystal display device set forth in claim 1, wherein: the conductive particles are provided only in an area which is 50 μm or more far from an interface between the liquid crystal layer and the sealing section.

13. The liquid crystal display device set forth in claim 1, wherein: the conductive particles are coated with a conductive material.

14. The liquid crystal display device of claim 1, wherein said first type of particles is formed by coating respective surfaces of elastic particles with a conductive material, and said second type of particles comprises glass fiber.

15. The liquid crystal display device of claim 1, wherein said sealing section is formed by mixing said first and second types of particles into a thermosetting material in predetermined proportions.

16. The liquid crystal display device of claim 1, wherein said sealing section is formed by applying a thermosetting material, to which said first and second types of particles are mixed, on one of the substrates, said one of the substrates is mated to the other of the substrates, and these mated substrates are pressurized at a pressure for deforming the first type of particles so that the first type of particles is deformed to a thickness approximately equal to a cell thickness defined by the second type of particles.

17. A liquid crystal display device, comprising:
a switching element substrate comprising a plurality of switching elements;
a counter substrate opposite to the switching element substrate;
a liquid crystal layer formed between the substrates;
a sealing section provided so as to enclose a display area between the substrates for sealing liquid crystal of the liquid crystal layer;
a first signal wiring, provided on one of the substrates for controlling the switching elements;
a second signal wiring, provided on the other substrate so as to be opposite to the first signal wiring for applying a voltage to the liquid crystal layer;
at least one transfer section for electrically connecting the first signal wiring or the second signal wiring and the substrate opposite to the first signal wiring or the second signal wiring, wherein said transfer section comprises both first and second types of particles, said first type of particles in said transfer section being conductive and having greater flexibility and greater size than said second type of particles in said transfer section, so that said first type of particles in said transfer section is for electrically connecting the first signal wiring or the second signal wiring and the substrate opposite to the first signal wiring or the second signal wiring, and said second type of particles is for spacing the substrates from one another; and
wherein: a mean distribution, volume D of the conductive particles (piece)/mm$^2$ is within a range of $1000 \geq D > 5/S$, where an area of the transfer section in a direction parallel to the substrates is S mm$^2$.

18. The liquid crystal display device set forth in claim 17, wherein: the transfer section includes (a) a first contact pad, provided on a first substrate which is one of the substrates and has an input terminal of the first signal wiring and an input terminal of the second signal wiring, which is connected to one of the first signal wiring and the second signal wiring provided on the first substrate, (b) a second contact pad, provided on a second substrate which is the other substrate, which is connected to the other one of the first signal wiring and the second signal wiring on the second substrate (the other substrate), and (c) the conductive particles connected to the first contact pad and the second contact pad.

19. The liquid crystal display device set forth in claim 18, wherein: the first and second contact pads have substantially a same resistance.

20. The liquid crystal display device set forth in claim 19, wherein: the transfer section is provided (a) between the first signal wiring and a first signal generation circuit which provides a signal to the first signal wiring, or (b) between the second signal wiring and a second signal generation circuit which provides a signal to the second signal wiring.

21. The liquid crystal display device set forth in claim 18, wherein: the transfer section is provided (a) between the first signal wiring and a first signal generation circuit which provides a signal to the first signal wiring, or (b) between the second signal wiring and a second signal generation circuit which provides a signal to the second signal wiring.

22. The liquid crystal display device set forth in claim 18, wherein: the first substrate is the switching element substrate having the switching elements.

23. The liquid crystal display device set forth in claim 18, wherein: the input terminal of the first signal wiring and the input terminal of the second signal wiring are made of a conductive material whose resistance is smaller than that of the first signal wiring or the second signal wiring formed on the second substrate.

24. The liquid crystal display device set forth in claim 18, wherein: an insulation film having an opening is formed on at least one of the substrates, and the first contact pad or the second contact pad is provided in the opening.

25. The liquid crystal display device set forth in claim 17, wherein: the mean distribution volume D is within a range of $600 \geq D > 5/S$.

26. The liquid crystal display device set forth in claim 25, wherein: the mean distribution volume D is within a range of $400 \geq D > 5/S$.

27. A liquid crystal display device, comprising:
a switching element substrate comprising a plurality of switching elements;
a counter substrate opposite to the switching element substrate;
a liquid crystal layer formed between the substrates;
a sealing section provided so as to enclose a display area between the substrates for sealing liquid crystal of the liquid crystal layer;
a first signal wiring, provided on one of the substrates for controlling the switching elements;
a second signal wiring, provided on the other substrate so as to be opposite to the first signal wiring for applying a voltage to the liquid crystal layer;

at least one transfer section for electrically connecting the first signal wiring or the second signal wiring and the substrate opposite to the first signal wiring or the second signal wiring, wherein said transfer section comprises both first and second types of particles, said first type of particles in said transfer section being conductive and having greater flexibility and greater size than said second type of particles in said transfer section, so that said first type of particles in said transfer section is for electrically connecting the first signal wiring or the second signal wiring and the substrate opposite to the first signal wiring or the second signal wiring, and said second type of particles is for spacing the substrates from one another; and wherein said at least one transfer section has a staggered structure.

* * * * *